United States Patent
Marques Barroca et al.

(10) Patent No.: US 12,546,422 B2
(45) Date of Patent: Feb. 10, 2026

(54) FEMALE ELEMENT OF A QUICK CONNECTOR, AND ASSOCIATED QUICK CONNECTOR

(71) Applicant: STAUBLI FAVERGES, Faverges-Seythenex (FR)

(72) Inventors: Serafim Marques Barroca, Albertville (FR); Christophe Durieux, Gilly sur Isere (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 39 days.

(21) Appl. No.: 18/587,874

(22) Filed: Feb. 26, 2024

(65) Prior Publication Data

US 2024/0288107 A1 Aug. 29, 2024

(30) Foreign Application Priority Data

Feb. 27, 2023 (FR) ...................................... 2301775

(51) Int. Cl.
*F16L 37/40* (2006.01)
*F16L 37/00* (2006.01)
*F16L 37/084* (2006.01)

(52) U.S. Cl.
CPC .......... *F16L 37/084* (2013.01); *F16L 37/004* (2013.01); *F16L 37/40* (2013.01)

(58) Field of Classification Search
CPC ................................ F16L 37/004; F16L 37/40
See application file for complete search history.

(56) References Cited

U.S. PATENT DOCUMENTS 2,521,701 A * 9/1950 Earle ...................... F16L 37/23
439/348
3,104,088 A 9/1963 Cator
(Continued)

FOREIGN PATENT DOCUMENTS

CN 208565907 U 3/2019
CN 211951821 U 11/2020
(Continued)

OTHER PUBLICATIONS

Search Report issued in FR 2301775, dated Jul. 28, 2023.

*Primary Examiner* — Matthew Troutman
*Assistant Examiner* — James A Linford
(74) *Attorney, Agent, or Firm* — MARSHALL, GERSTEIN & BORUN LLP

(57) ABSTRACT

This female element of a quick connector is intended to be coupled with a complementary male element and comprises a female body defining an insertion channel receiving the male element, the locking members, which are received in housings arranged in the female body, a plunger, which is movable along a central axis of the female element and pushes each locking member toward a distal position where this locking member projects into the insertion channel, and an operating ring, which surrounds the female body and is configured to drive the plunger. For simpler, more compact construction, each locking member and the plunger are configured to be magnetically attracted to each other, while the plunger is able to magnetically drive each locking member to its proximal position when the plunger is displaced to its back position.

19 Claims, 14 Drawing Sheets

(56) References Cited

U.S. PATENT DOCUMENTS

| | | | | |
|---|---|---|---|---|
| 3,586,048 | A | * | 6/1971 | Arnold .................... F16L 37/32 |
| | | | | 137/614.04 |
| 7,252,112 | B1 | * | 8/2007 | Imler ...................... F16L 37/32 |
| | | | | 137/614.04 |
| 2007/0278791 | A1 | | 12/2007 | Tiberghien et al. |
| 2016/0138744 | A1 | * | 5/2016 | Polgati ................ F16L 27/0828 |
| | | | | 29/898.064 |
| 2020/0182389 | A1 | * | 6/2020 | Frère ..................... F16K 15/063 |
| 2020/0363000 | A1 | | 11/2020 | Tiberghien et al. |
| 2023/0100434 | A1 | * | 3/2023 | Hegenbart .............. F16L 51/03 |
| | | | | 411/103 |
| 2024/0288107 | A1 | * | 8/2024 | Marques Barroca . F16L 37/084 |

FOREIGN PATENT DOCUMENTS

| | | | |
|---|---|---|---|
| CN | 218063864 | U | 12/2022 |
| EP | 1793154 | A2 | 6/2007 |
| FR | 2901860 | A1 | 12/2007 |
| FR | 3096109 | A1 | 11/2020 |

* cited by examiner

FEMALE ELEMENT OF A QUICK CONNECTOR, AND ASSOCIATED QUICK CONNECTOR

FIELD

The present invention relates to a female element of a quick connector, as well as to a quick connector comprising such a female element and a complementary male element.

BACKGROUND

Quick connectors are fluid connection devices comprising a female element and an associated male element, for example a plug. Each of the male and female elements comprises an internal passage, the internal passages being in fluid communication when the coupling is in the coupled configuration. The female element usually comprises a locking device, which engages automatically when the male and female elements are connected, so as to maintain the connector in the coupled configuration, hence the name quick connector.

In many industrial fields, equipment requires a temperature control, which is carried out by supplying heat transfer fluids such as cold water, hot water, glycol water or other fluids. For example, in the plastics processing industry, an injection molding machine comprises components, in particular molds, which need the temperature to be controlled by a water circuit that passes through the thermal convection zones of these components. Connecting the water circuit pipes requires a quick-fit solution, the male and female elements of which must be easy to connect and disconnect, in a secure manner.

It is known to use a plug and a female element containing balls that come into contact with the outer surface of the plug and enter a groove in the plug to lock the quick connector in the coupled configuration.

FR2901860A1 describes, for example, a female element of a fluid connector comprising an element body 21 pierced with inclined radial recesses 40b which accommodate locking fingers, which are pushed back by a plunger 31 which is driven forward by a spring 32. The female element can be unlocked by the action of an operating ring 30 which acts directly on the locking fingers, by means of a mechanical link formed by two lugs 40g and a rod 40j. This solution has the disadvantage of complicating the shapes of the operating ring and each locking finger, which poses a problem in terms of design, industrialization costs and overall dimensions.

FR3096109A1, on the other hand, describes an angled-finger quick-connect element with an operating ring that also comprises a sleeve with an inner wall allowing the locking fingers to be returned by lifting on disconnection. Here too, this solution has the disadvantage of increasing the radial size of the female element to perform the function, which poses a problem in terms of size, weight and industrial cost.

SUMMARY

It is to these problems that the invention more particularly seeks to remedy, by proposing a female quick connector element which is secure by being both simple to produce and space saving.

To this end, the invention relates to a female quick connector element intended for the removable connection of pressurized fluid pipes, said female element being suitable for coupling with a complementary male element and comprising:

a hollow female body defining an insertion channel, the insertion channel defining a central axis of the female body and opening out from the female body by a mouth, the mouth defining a front side of the female element, at least one locking member, which is received in a respective housing formed in the thickness of the female body:
  each housing being inclined relative to the central axis of the female body and opening into the insertion channel,
  each locking member being movable in its housing between a distal position, in which the locking member projects into the insertion channel, and a proximal position, in which the locking member does not project into the insertion channel;

a plunger:
  which comprises a wall oriented toward each housing, and
  which is movable between a front position, in which the wall of the plunger holds each locking member in its distal position, and a rear position, in which each locking member is in its proximal position, an operating ring, which surrounds the female body and which is movable relative to the female body along the central axis between an advanced position and a retracted position, the operating ring being configured to drive the plunger from the front position to the rear position when the operating ring is displaced from the advanced position to the retracted position, and a first return member, configured to return the operating ring toward the advanced position.

According to the invention:
each locking member and the plunger are configured to be magnetically attracted to each other, and
the plunger is able to magnetically drive each locking member toward its proximal position when the plunger is displaced toward its rear position.

Thanks to the invention, when the quick connector is coupled, the wall of the plunger pushes the locking members back onto the male element, thereby securing the coupling. When the connector is uncoupled, the male element is unlocked simply by moving the plunger wall to its rear position, without the need for any additional mechanical device other than the plunger. The female element according to the invention is therefore particularly simple to implement. The absence of any mechanical connection between the plunger and the locking elements allows any additional thickness to be limited during the design of the the female element, which saves space.

According to advantageous but non-mandatory aspects of the invention, such a female element may incorporate one or more of the following features taken in isolation or in any technically permissible combination:

The plunger is integral with the operating ring.

The plunger is a return ring, which is centered on the central axis of the female element, is movable in translation relative to the operating ring, and is interposed radially between the operating ring and the female body.

the operating ring comprises an axial stop, while the female element comprises a second return member, which is configured to push the return ring back into its advanced position against the axial stop.

The locking member is a ball.

The locking member is a pin, which extends according to a guide axis of the housing.

At least one element from among, on the one hand, each locking member and, on the other hand, the plunger, is magnetic and is able to magnetically attract respectively the plunger or each locking member.

Each locking member and the plunger are made of a ferromagnetic material or are coated with a layer of ferromagnetic material.

The plunger or each locking member comprises a ferromagnetic insert oriented toward each locking member or the plunger respectively.

The female body comprises a front body, in which each housing is provided, while the front body is made of a non-magnetic material.

The female element comprises an elastic sleeve, which is axially arranged and extends in a continuous manner between the body and the operating ring, and which deforms elastically when the operating ring is displaced between the advanced and retracted positions.

The wall of the plunger extends according to a cone of revolution centered on the central axis, the cone being open toward the front and presenting, relative to the central axis, an angle at the apex preferably equal to 40°.

The female element comprises a valve for closing the insertion channel, the valve being movable along the central axis of the female element.

The plunger comprises a radial wall, which is configured to magnetically attract the locking member and which extends parallel to the central axis according to a length greater than or equal to a stroke of the operating ring between its advanced position and its retracted position, minus an amount of axial displacement of the locking member between its distal position and its proximal position.

The return member of the operating ring comprises a spring, which is interposed radially between the female body and the operating ring.

The invention also relates to a quick connector designed for the connection of pressurized fluid pipes, the quick connector comprising:

a female element as defined above, and a male element complementary to the female element, the male element being configured to be coupled with the female element in a coupled configuration of the connector, wherein:

the male element comprises a male body, which is able to be received in the insertion channel of the female body and which extends according to a main axis, the main axis of the male element and the central axis of the female element being coaxial when the male body is received in the insertion channel of the female element, the male body comprises a first surface, which is able to push the locking members into their proximal position when the male body is inserted into the insertion channel, and the first surface is inclined, relative to the main axis, at an angle of between 20° and 40°, for example equal to 30°.

Advantageously:

the male body comprises a second surface, which is able to cooperate with the locking members while the locking members are in a distal position so as to prevent axial withdrawal of the male body, the second surface being inclined relative to the main axis and forming with the main axis an angle of between 30° and 60°, for example equal to 450.

The male element comprises a protective cover, which is configured to rest on an annular wall of the operating ring, in the coupled configuration of the quick connector.

BRIEF DESCRIPTION OF THE DRAWINGS

The invention will be better understood, and other advantages thereof will become clearer, in the light of the following description of several embodiments of a female quick connector element and a quick connector, in accordance with its principle, given by way of example only and made with reference to the appended drawings, in which.

DESCRIPTION

Figure 1:
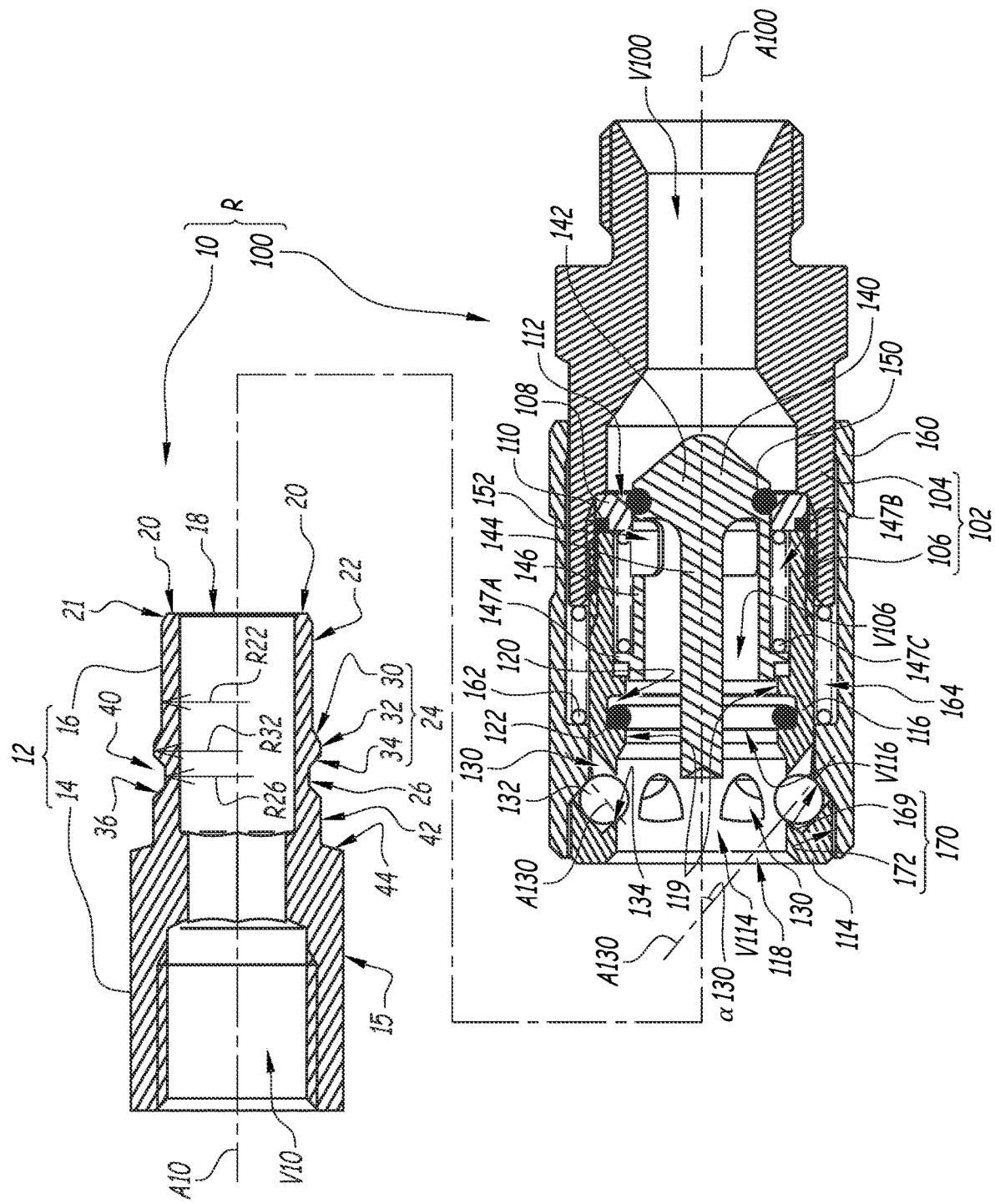
FIG. 1 is a longitudinal section of a quick connector, in accordance with a first embodiment of the invention, comprising a female element and an associated male element, shown in a first so-called disconnected configuration.

FIG. 1 shows a quick connector R in accordance with a first embodiment of the invention. The quick connector R, hereinafter referred to simply as connector R, comprises a male element 10, shown at the top of FIG. 1, and an associated female element 100, shown at the bottom of FIG. 1. In FIG. 1, the connector R is shown in an uncoupled configuration, in which the male element 10 and the female element 100 are separated from each other. During the connection of the male element 10 to the female element 100, the male element is positioned facing the female element 100. A front side of the male element 10 is thus oriented toward the female element 100, in other words, here toward the right of the figures, whereas a rear side of the male element 10 is oriented away from the front side of the male element 10, that is here, toward the left of the figures. In a symmetrical manner, a front side of the female element 100 is oriented toward the male element 10, that is here, toward the left of the figures, whereas a rear side of the female element 100 is oriented opposite the front side of the female element 100, that is here, toward the right of the figures.

For each of the male 10 or the female 100 elements of the connector R, the notions of "distal" and "proximal" are equivalent to the notions of "front" and "rear" associated with the corresponding male 10 or the female 100 element. By way of illustration, for the female element 100, a proximal component or position designates a component or position located on the rear side of the female element 100, and a proximal surface designates a surface oriented to the rear of the female element 100. For a given axis, a direction radial to this axis is a direction orthogonal to this axis. A plane transversal to this axis is a plane orthogonal to this axis. A plane radial to this axis is a plane bearing this axis. A direction orthoradial to this axis is a direction orthogonal to a plane radial to this axis, without intersecting this axis.

The male element 10 is described first.

The male element 10 here, is a plug, comprising a tubular male body 12 presenting a generally rotationally symmetrical shape about a central axis A10. The male body 12 delimits a duct V10 for fluid circulation. By extension, the duct V10 defines an inner side of the male element 10, the male element 10 separating the inner side from an outer side of the male element 10. The outer side of the male element 10 is here a surface of revolution, oriented centrifugally toward the central axis A10.

The male body 12 comprises a rear part 14, which is here threaded and is configured to be fluidly connected to a pipe. The pipe is not shown. The rear part 14 presents a gripping surface 15 on the external side. The gripping surface 15 is a cylindrical surface, for example with a hexagonal cross-section.

The male body 12 comprises a front portion, so-called distal portion 16, which is designed to be fitted into the female element 100 in the coupled configuration of the connector R. The rear part 14 and the front portion 16 are here made in one piece.

The internal duct V10 opens out from the distal portion 16 by a mouth 18, which is oriented toward the front of the male element 10, in other words, the mouth 18 of the male element 10 is oriented toward the female element 100 in the disconnected configuration of the connector R.

On the external side of the male element 10, the distal portion 16 comprises, as one moves away from the mouth 18 toward the rear of the male element 10, an annular wall 20, an end bevel 21, a first cylindrical portion 22, a collar 24, and a second cylindrical portion 26.

The annular wall 20 here extends orthogonally to the main axis A10. The annular wall 20 forms support means for the male element 10, which are configured to cooperate with certain members of the female element 100, this aspect being described later.

The end bevel 21 presents an inclined surface relative to the main axis A10. The end bevel 21 is here geometrically carried by a cone diverging toward the rear of the male element 10.

The first cylindrical portion 22 presents a circular cross-section centered on the main axis A10 and comprises an external cylindrical surface presenting a constant outer radius R22. The second cylindrical portion 26 presents a circular cross-section centered on the main axis A10 and presents a constant outer radius R26.

In the illustrated example, the outer radius R22 of the first cylindrical portion 22 is different from the outer radius R26 of the second cylindrical portion 26. Preferably, the outer radius R22 of the first cylindrical portion 22 is strictly greater than the outer radius R26 of the second cylindrical portion 26. Alternatively, not shown, the outer radii R22 and R26 are equal.

The collar 24 connects the first cylindrical portion 22 to the second cylindrical portion 26. The collar 22 extends radially in projection from both the first cylindrical portion 22 and the second cylindrical portion 26.

The collar 22 is formed here by a front ramp, referred to as the first surface 30, a central part 32 and a rear ramp, referred to as the second surface 34.

The central part 32 is here, a cylindrical portion of circular cross-section centered on the main axis A10. The central part 32 of the collar 24 presents a radius R32, which is greater than the radii R22 and R26 of the first and second cylindrical portions 22 and 26.

The first surface 30 connects the first cylindrical portion 22 to the central part 32. The first surface 30 is a frustoconical surface, which is centered on the main axis A10 and diverges toward the rear of the male element 10. The first surface 30 is inclined, relative to the main axis A10, at an angle preferably between 20° and 40°, for example equal to 30°, as in the example of FIG. 1.

The second surface 34 connects the central part 32 to the second cylindrical portion 26. The second surface 30 is a frustoconical surface which is centered on the main axis A10 and converges toward the rear of the male element 10. The second surface 34 is inclined, relative to the main axis A10, at an angle preferably between 30° and 60°, for example equal to 45°, as in the example of FIG. 1.

The distal portion 16 also comprises, on the outer side of the male element 10, a third surface 36, which is connected to the second surface 34 by means of the second cylindrical portion 26. The third surface 36 is a frustoconical surface, which is centered on the main axis A10 and diverges toward the rear of the male element 10. In the example shown, the third surface 36 is inclined at an angle of 45° relative to the main axis A10. Preferably, the angle of inclination of the third surface 36 relative to the main axis A10 is equal, in absolute value, to the angle of inclination of the second surface 34 relative to the main axis A10.

The second surface 34, the second cylindrical portion 26 and the third surface 36 together form a groove 40, located at the rear of the collar 24, the second cylindrical portion 26 forming a bottom of this groove 40, while the second surface 34 forms a distal surface of this groove 40, and the third surface 36 forms a proximal surface of this groove 40.

From the front toward the rear of the male element 10, the third surface 36 is here connected to the gripping surface 15 by a third cylindrical portion 42 and by a shoulder 44.

The female element 100 of the quick connector R is now described.

The female element 100 comprises a female body 102, which presents a generally rotationally symmetrical shape about a central axis A100. The female body 102 is hollow and delimits a duct V100 for fluid circulation. The duct V100 defines an inner side of the female element 100, which separates the inner side from an outer side of the female element 100. When the quick connector R is in the coupled configuration, the duct V10 of the male element 10 is fluidly connected to the duct V100 of the female element 100, the main axis A10 and the central axis A100 being coaxial. The central axis A100 is also the so-called the press-fit axis.

The female body 102 comprises a rear body 104 and a front body 106, which are two hollow bodies of revolution assembled here to each other by screwing. In this embodiment, the female element 100 comprises a support ring 108, which is interposed axially between the rear body 104 and the front body 106. Advantageously, the support ring 108 houses a distal seal 110, which contributes to sealing the screw connection between the rear body 104 and the front body 106. The support ring 108 presents a form of revolution about the central axis A100 and comprises a beveled wall 112, which is oriented toward the central axis A100 and toward the rear of the female element 100. In other words, the support ring 108 is beveled on an inside diameter.

Internally, the front body 106 delimits an insertion channel V106 for the male element 10. The insertion channel V106 is a portion of the duct V100 of the female element 100. The front body 106 comprises an insertion portion 114, which presents an annular shape centered on the central axis A100 and which delimits a front volume V114 configured to receive and guide the male element 10 during the connection, or insertion, of the male element 10 into the female element 100, and a proximal portion 116, which presents an annular shape centered on the central axis A100, which is located toward the rear of the insertion portion 114 and which delimits a proximal volume V116. The front volume V114 and proximal volume V116 are portions of the insertion channel V106. The front volume V114 opens out towards the front of the female body 102 by a mouth 118.

The proximal volume V116 is configured to receive the male element 10, in particular to receive the first cylindrical portion 22 of the male element 10. The proximal portion 116 comprises guide surfaces 119, which are configured to guide the male element 10, and a groove 120, which is recessed in the proximal portion 116 and houses an annular seal 122. The annular seal 122 is configured to provide a seal between the male element 10 and the female element 100 when the male element 10 is received in the proximal volume V116. Thus, an inner diameter of the annular seal 122 is slightly smaller than an outer diameter of the first cylindrical portion 22, the annular seal 122 being elastically deformable to accommodate the passage of the male element 10. In the illustrated example, the proximal portion 116 comprises two guide surfaces 119, which are located on either side of the groove 120.

The front body 106 comprises a number of housings 130, here not limited to six, which are arranged in the thickness of the female body 100, here through the front body 106. Preferably, the housings 130 are distributed around the periphery of the front body 106 about the central axis A100. Each housing 130 is configured to receive a respective locking member. In the first embodiment, the locking members are advantageously balls 132, which are widely available and inexpensive.

Each housing 130 opens into the insertion channel V106, in particular into the front volume V114. Each housing 130 is here machined, in particular drilled, so that a bottom 134 of the hole forms a stop, which partially closes each housing 130 in such a way as to prevent the ball 132 received in the housing 130 from passing completely into the insertion channel V106. In other words, each housing 130 is open to the insertion channel V106. The shape of the bottom 134 of each housing 130 is not limiting. In an alternative, not shown, the bottom 134 of the hole is dimensionally adapted, in particular by reducing or increasing the size of the opening onto the insertion channel V106, while maintaining a stop, here formed by the bottom 134, which prevents the balls 132 from passing completely into the insertion channel V106.

For each housing 130 receiving a ball 132, when this ball 132 presses against the bottom 134 of the corresponding housing, this ball 132 is in a so-called distal position, in which this ball 132 projects into the insertion channel V106. Each housing 130 presents an elongated shape according to a guide axis A130, so that each ball 132 is movable between the distal position and a so-called proximal position, in which the ball 132 does not project into the insertion channel V106. As detailed below, each housing 130 is inclined, so the distal position of each ball 132 is a front position, while the proximal position is a rear position. In other words, in its proximal position, the ball 132 reaches a radial position further away from the central axis A100 than in the distal position. In particular, in the proximal position of the ball 132, a male element 10 previously inserted into the insertion channel V106 can be freely withdrawn from the insertion channel V106.

On the external side of the female element 100, each housing 130 opens completely onto the outside of the female body 102, in other words, each housing presents an opening, sufficient to allow insertion of the corresponding ball 132 during manufacture and assembly of the female element 100.

Each housing 130 extends here along a guide axis A130 inclined relative to the central axis A100. By inclined, it is understood that each guide axis A130 forms, relative to the central axis A100, an angle of 0° to 80°, preferably 20 to 70°, even more preferably 30 to 50°. The guide axes A130 are here geometrically carried by a cone, which is centered on the central axis A100 and diverges toward the rear of the female element A100, each guide axis A130 forming, with the central axis A100, a guide angle α130 which is here equal to 40°, this value not being limiting. In other words, the housings 130 are inclined, toward the rear of the female element 130, by 40° relative to the central axis A100.

Each ball 132 is received in the corresponding housing 130 with dimensional clearance, in such a way as not to impede the movement in translation of the ball 132 along the guide axis 130. Each ball 132 is thus guided in translation along the guide axis A130 associated with this housing 130.

In the first embodiment, the balls 132 are "magnetic", in other words, they are permanently magnetized. In other words, the balls 132 present magnetic remanence properties and are therefore likely to attract another element made of ferromagnetic material. The magnetic balls 132 are here made of a material with high magnetic susceptibility, such as neodymium. The balls 132 here, present a magnetic remanence of the order of 1.3°T—Tesla.

The front body 106, in which the housings 130 are drilled, is made of a non-magnetic material, in other words, a material which is not likely to be attracted or repelled by a magnet. A non-magnetic material is one the magnetic susceptibility of which is low, for example less than $10^{-3}$. In the example shown, the front body 106 is made of brass. Thus, the balls 132 are not attracted by the front body 106.

Similarly, the male body 12 is made of a non-magnetic material. The balls 132 are not attracted by the male body 10. In the example shown, the male body 12 is made of brass.

The female element 100 also comprises a valve 140, which is received in the duct V100 of the female element 100. The valve 140 is guided in translation along the central axis A100 between a distal position, in which the valve 140 closes the insertion channel V106 of the female element 100, and a proximal position, in which the valve 140 does not prevent fluid passage in the insertion channel V106 of the female element 100.

In the example shown in FIG. 1, the valve 140 comprises a central mushroom-shaped body with a head 142 and a stem 144. In the example shown, the head 142 of the valve 140 is seen in cross-section and presents a generally triangular, in particular conical, shape, while the stem 144 presents the shape of a cylinder of circular cross-section aligned with the central axis A100.

The valve 140 also comprises an external cylindrical envelope 146, which extends from the head 142 facing and at a distance from the stem 144. The cylindrical envelope 146 presents a circular cross-section centered on the central axis A100 when the female element 100 is assembled, as shown in the figures. The cylindrical envelope 146 comprises a rear extremity, by which the cylindrical envelope 146 is connected to the head 142, and a front extremity, opposite the rear extremity.

The valve 140 also comprises an external collar 147A, which is here radially protruding from the cylindrical envelope 146 in the vicinity of the front extremity of the cylindrical envelope 146. The collar 147A is received in a counterbore 147B formed in the front part 106, in such a way as to guide the valve 140 in translation relative to the female body 102 along the central axis A100. The counterbore 147B is here machined in the front part 106 of the female body 102. On the front side, the counterbore 147B presents a bottom which forms a front stop for the collar 147A, while on the rear side, the counterbore 147B opens onto a front face of support ring 108. The female element 100 also comprises a return member, in this case a return spring 147C, which is received in the counterbore 147B between the cylindrical casing 146 and the front body 106. The return spring 147C presses, on the one hand, against a rear side of the collar 147A and, on the other hand, against the front face of the support ring 108, driving the valve 140 toward the front of the female element 100, in other words, driving the valve 140 toward its distal position.

The head 142 of the valve 140 comprises an annular outer groove, which accommodates a valve seal 150. The valve seal 150 presents a diameter greater than an internal diameter of the support ring 108, in such a way that the beveled wall 112 of the support ring 108 forms a sealing seat for the valve seal 150. When the valve 140 is in the distal position, the valve seal 150 presses against the chamfered wall 112, preventing any fluid passage between the head 142 of the valve 140 and the support ring 108, thus closing off the duct V100 of the female element 100. If, for any reason, the valve seal 150 is ejected from the groove provided in the head 142, for example if the valve seal 150 breaks, the collar 147A is configured to stop the valve 140 at the front of the female element 100, the collar 147A abutting against the bottom of the counterbore 147B.

The cylindrical envelope 146 comprises at least one recess 152, in this case three recesses 152, which form fluid passages through the valve 140 when the valve 140 is not in the distal position.

It is understood that, in the absence of an external force, the return spring 147C pushes the valve back into its distal position, closing the duct V100 in a sealed manner. When an axial force, parallel to the central axis A100 and oriented toward the rear of the female element 100, is exerted on the valve 140, this effect being exerted, for example, on the front extremity of the cylindrical envelope 146 or on the stem 144, this force tends to displace the valve toward its proximal position against the return spring 147C, allowing fluid to pass through the duct V100 of the female element 100.

Figure 2:
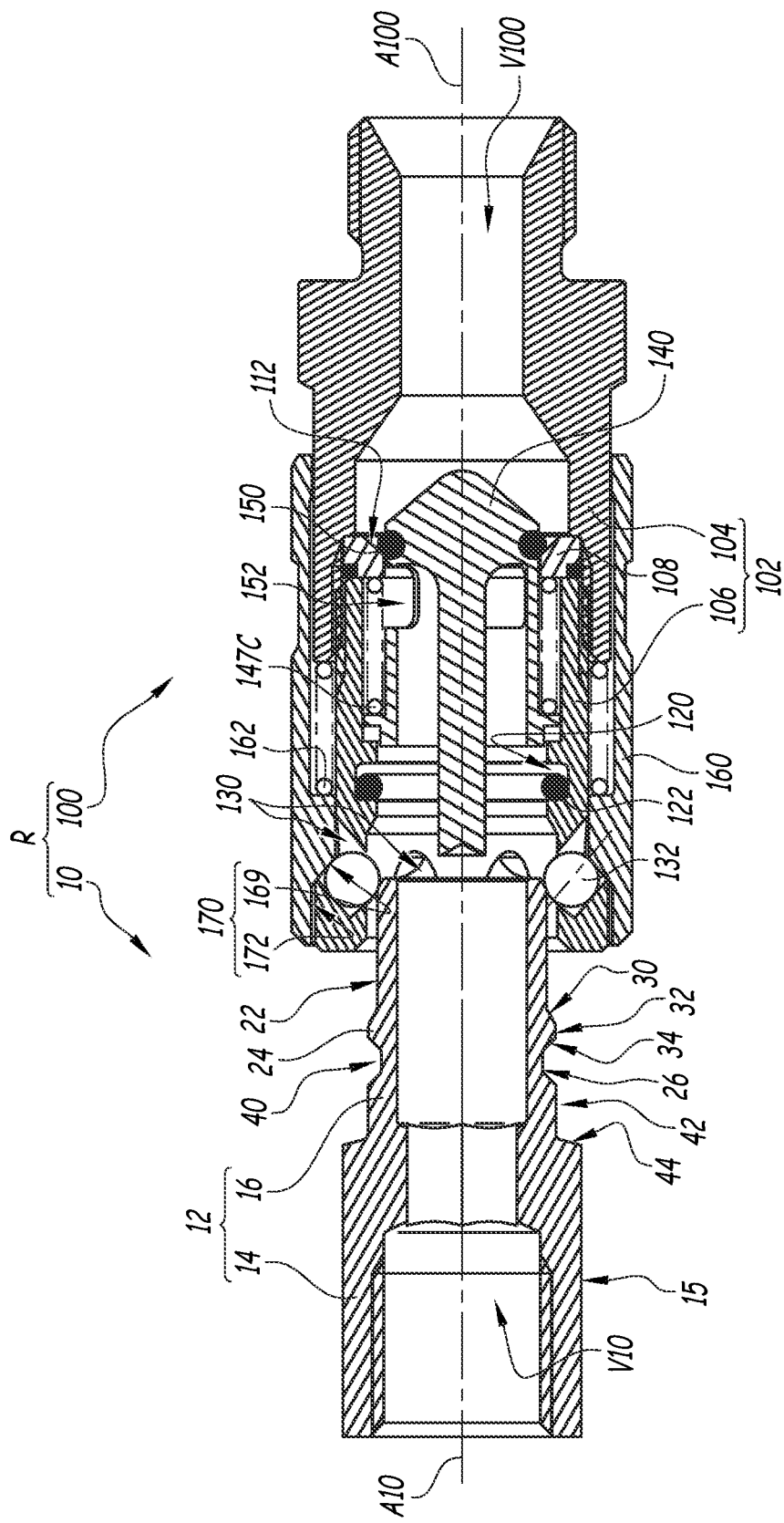
FIG. 2 is a longitudinal section of the quick connector of FIG. 1, shown in a first intermediate configuration, during a coupling movement of the quick connector.

The female element 100 also comprises an operating ring 160. The operating ring 160 presents the form of rotational symmetry about the central axis A100 and is arranged around the female body 102. The operating ring 160 is guided in translation along the central axis A100, in other words, it can be movable in translation relative to the female body 102 along the central axis A100, between an advanced position and a retracted position. In FIGS. 1 and 2, the operating ring 160 is shown in the advanced position.

The female element 100 also comprises a return member, in this case a locking spring 162, which pushes the operating ring 160 from its retracted position toward its advanced position. The locking spring 162 is here received in a radial recess 164 arranged between the female body 102 and the operating ring 160. The operating ring 160 comprises an inclined wall 169, which belongs to a plunger 170. In the first embodiment, the plunger 170 is a portion of the operating ring 160. The wall 169 of the plunger 170 is geometrically supported by a cone that diverges toward the front of the female element 100. The wall 169 of the plunger 170 here presents a frustoconical profile, which is inclined relative to the central axis A100. The wall 169 of the plunger 170 is inclined relative to the central axis A100 according to an angle which here is equal to 50°. Alternatively, another angle could be used, for example, the inclined wall 169 of the plunger 170 could be inclined at an angle of 40° relative to the central axis A100. Preferably, the guide axis A130 of each housing 130 is orthogonal to the wall 169 of the plunger 170, as in the illustrated example. Alternatively, the guide axis A130 of each housing 130 is inclined to the wall 169 of the plunger 170.

In the first embodiment, the plunger 170 is integral with the operating ring 160, in other words, the movements of the plunger 170 are identical to the movements of the operating ring 160. When the operating ring 160 is in the advanced position, the plunger 170 is in a front position, whereas when the operating ring 160 is in the retracted position, the plunger 170 is in a rear position. In other words, the operating ring 160 is configured to drive the plunger 170 from the front position toward the rear position when the operating ring 160 is displaced from the advanced position to the retracted position, without any additional mechanical components.

In the uncoupled configuration shown in FIG. 1, the operating ring 160 is pushed back by the locking spring 162 toward its advanced position, pushing each ball 132 toward its distal position. By extension, the plunger 170 maintains each ball 132 in its distal position. Preferably, a minimum dimensional clearance is provided between each ball 132 and the plunger 170, in such a manner as to relieve forces exerted on the balls 132 or on other parts of the female element 100.

Alternatively, but not illustrated, in the uncoupled configuration of the connector R, the plunger 170 presses against the balls 132 by means of the wall 169, each ball 132 abutting against the bottom 134 of the corresponding housing 130.

In the first embodiment, the operating ring 160 is made of a ferromagnetic material, in other words, a material likely to be attracted by the balls 132, here made of neodymium. In other words, each ball 132—and more generally each locking member—and the plunger 170 are configured to be magnetically attracted to each other. In the first embodiment of the invention, the operating ring 160 is made of ferromagnetic stainless steel.

Schematically, each ball 132 moves along the corresponding guide axis A130, while the plunger 170 is displaced parallel to the central axis A100. It is understood that when the female element 100 is in the configuration shown in FIG. 1, if a user displaces the operating ring 160 toward its retracted position against the locking spring 162, in other words, toward the rear of the female element 100, then each ball 132, attracted by the operating ring 160, is driven from the distal position toward the proximal position. In other words, the plunger 170 is able to magnetically drive each ball 132 toward its proximal position when the plunger 170 is displaced toward its rear position. By extension, when the plunger 170 is in the rear position, each ball 132 is in its proximal position. The fact that the wall 169 is inclined relative to the main axis A100 and perpendicular to the guide axis A130 of the housings 130 facilitates the magnetic cooperation of the wall 169 with the balls 132, which favors the guiding of the balls 132 from their distal position to their proximal position.

Figure 7:
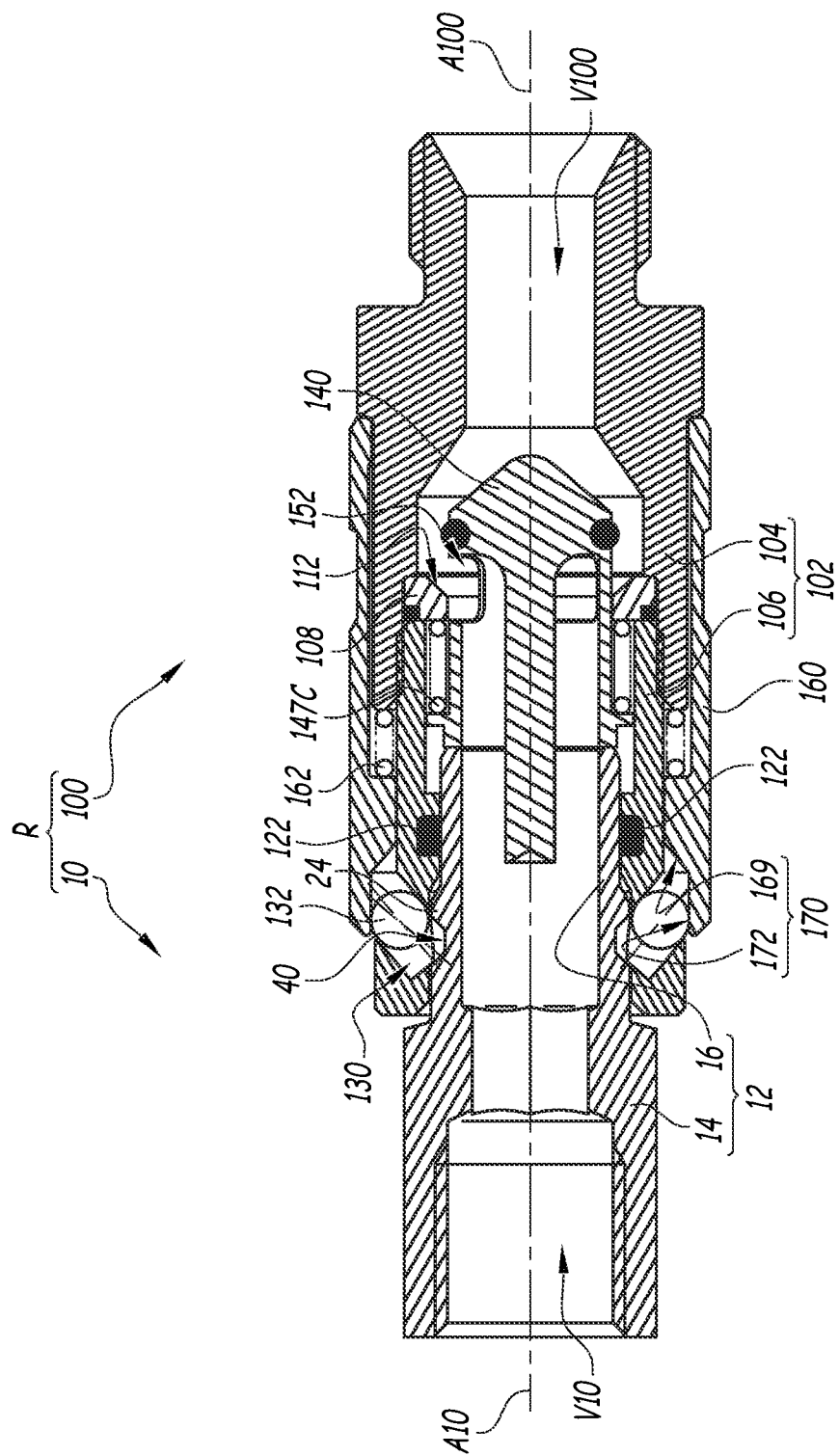
FIG. 7 is a longitudinal section of the quick connector of FIG. 1, shown in a fifth intermediate configuration, so-called unlocked configuration, during an uncoupling movement.

In the first embodiment, the plunger 170 advantageously comprises a radial wall 172, which extends parallel to the central axis A100 on the front side of the wall 169 of the plunger 170, the radial wall 172 being oriented toward the central axis A100. As shown in FIG. 7, the radial wall 172 serves to maintain contact between the balls 132 and the operating ring 160, in such a manner as to maintain each ball 132 in a proximal position even when the operating ring 160 is displaced toward its retracted position. More generally, the radial wall 172 is configured to magnetically attract each ball 132.

Preferably, the radial wall 172 of the plunger 170 extends parallel to the central axis according to a length greater than or equal to a stroke of the operating ring 160 between its advanced position and its retracted position, minus a value of an axial displacement of each ball 132 relative to the central axis A100, between its distal position and its proximal position, in such a manner as to maintain contact between the balls 132 and the operating ring 160 whatever the position of the operating ring 160. The stroke of the operating ring 160 and the amount of axial displacement of each ball 132 are measured parallel to the central axis A100.

The operation of the quick connector R, in particular, a sequence for coupling the male element 10 to the female element 100, is now described with reference to FIGS. 1 to 5.

In FIG. 1, the connector R is in the uncoupled configuration. The female element 100 maintains the internal duct V100 closed by means of the valve 140, which is pushed into the distal position by the return spring 147C, with the valve seal 150 pressing against the beveled wall 112 of the support ring 108. The operating ring 160 is maintained in the advanced position by the locking spring 162, the plunger 170 pushing each ball 132 into the distal position. The balls 132 project into the insertion channel V106.

Referring to FIG. 2, an operator presents the male element 10 facing the female element 100, the main axis A10 being aligned with the central axis A100, the front side of the male element 10 facing the front side of the female element 100. The operator then approaches the male element 10 toward the female element 100 according to an insertion movement, which is a movement in translation parallel to the central axis A100. The male element 10 is thus inserted into the insertion channel V106 of the female element 100. The balls 132 press against the end bevel 21 of the male body 12. The connector R is then in the configuration shown in FIG. 2.

As the insertion movement continues, the end bevel 21 slightly pushes each ball 132 back into its respective housing 130, which also pushes back the plunger 170. In other words, the male element 10 pushes each ball 132 from the distal, or front position to the proximal position, each ball 132 exerting a force on the wall 169 of the plunger 170 and pushing the plunger 170 from its front position toward its rear position. In the first embodiment, this also has the effect of slightly pushing the operating ring 160 toward the rear, against the locking spring 162. It is understood that if, for any reason, the plunger 170 or the operating ring 160 are blocked, then the insertion movement of the male element 10 is prevented, which provides security in the event of malfunction of the female element 100.

As the insertion movement continues, the balls 132 press against the first cylindrical portion 22, the movement continuing until the collar 24 of the male element 10 comes into contact with the balls 132. In particular, the first surface 30 comes into contact with the balls 132. The quick connector R is then in the configuration shown in FIG. 3. The valve 140 is still in the distal position, while the annular seal 122 is already ensuring a seal between the female element 100 and the male element 10.

Figure 3:
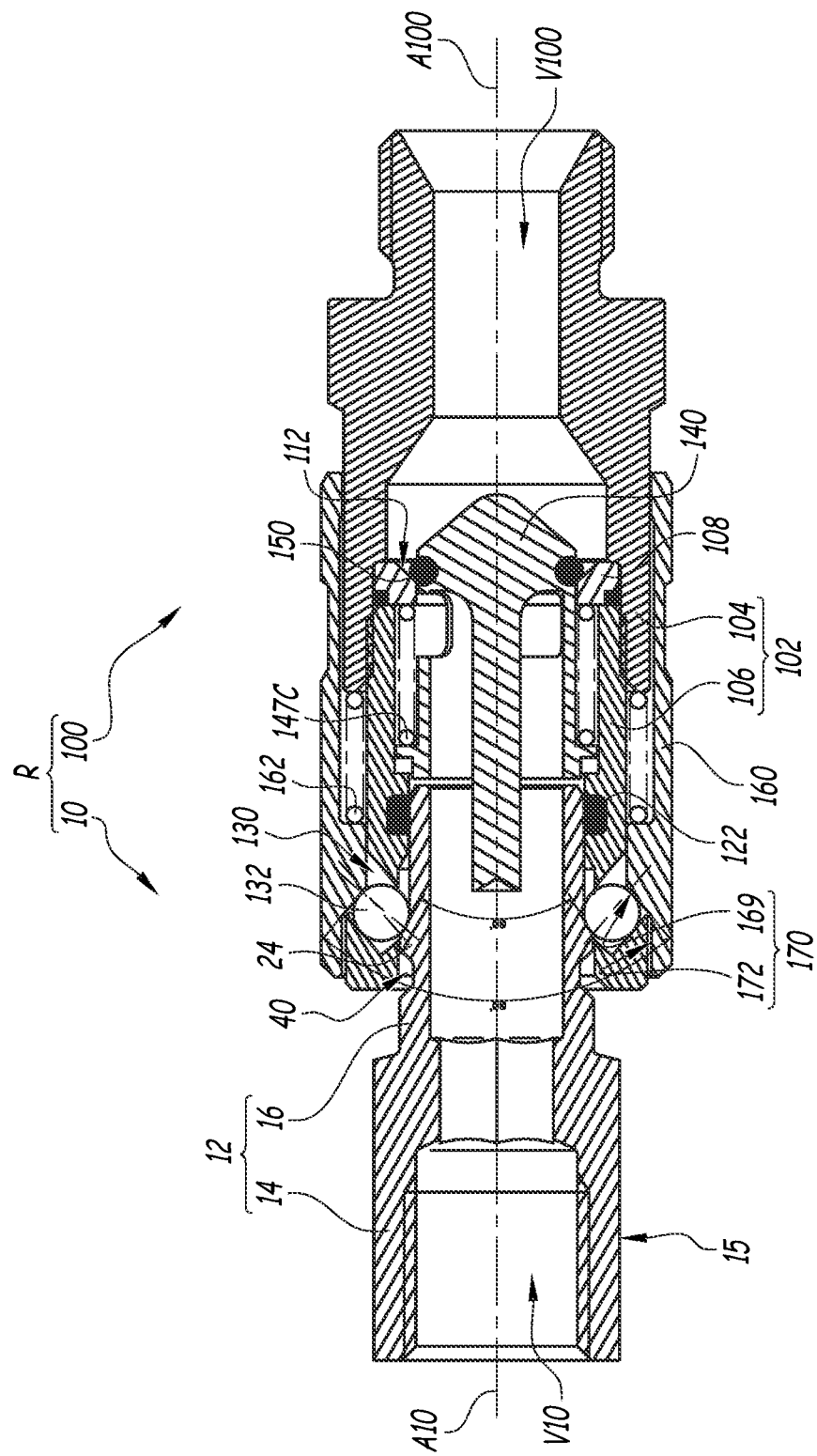
FIG. 3 is a longitudinal section of the quick connector of FIG. 1, shown in a second intermediate configuration during the coupling movement.
Figure 4:
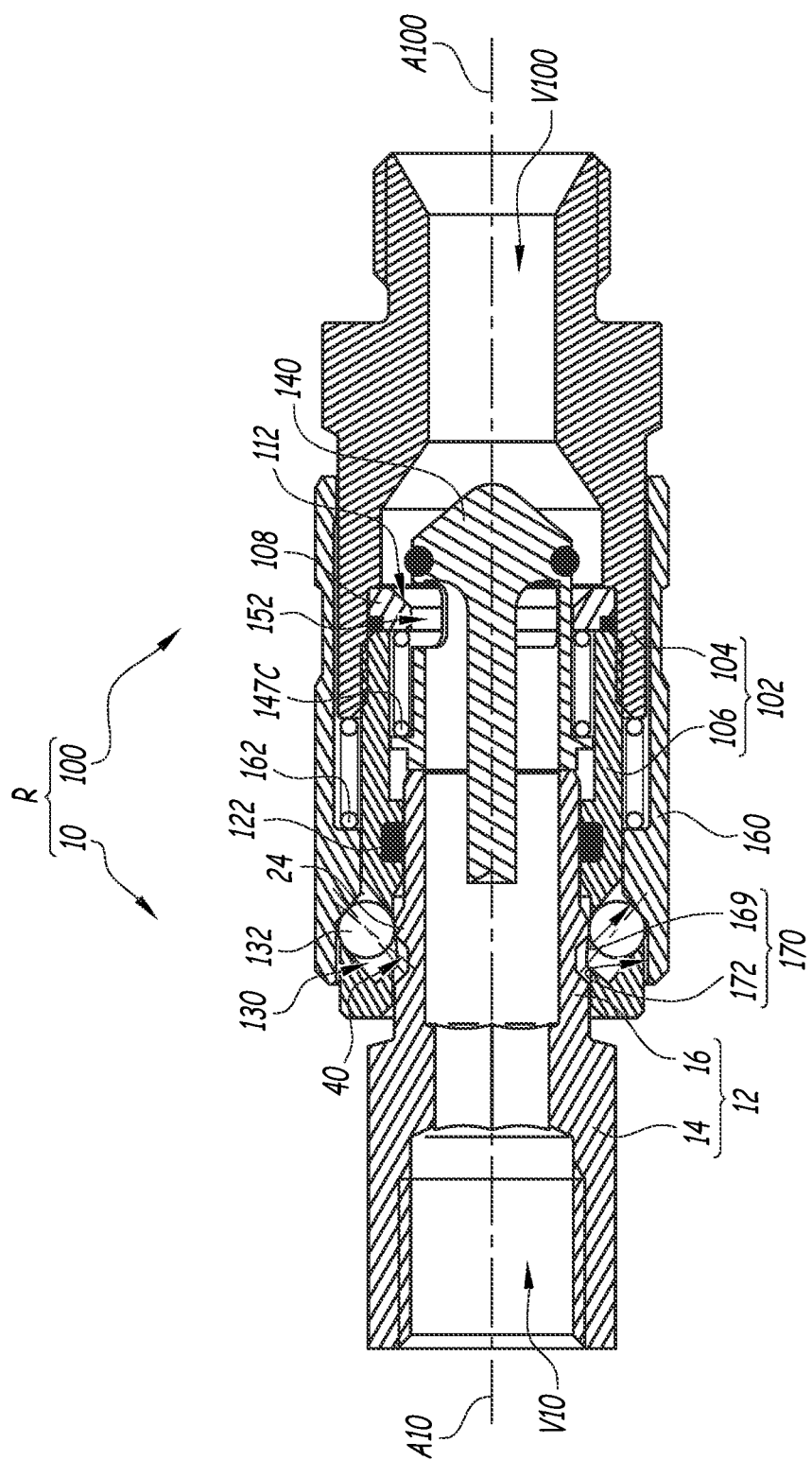
FIG. 4 is a longitudinal section of the quick connector of FIG. 1, shown in a third intermediate configuration, during a coupling movement of the quick connector.

From the configuration shown in FIG. 3, as the insertion movement continues, the balls 132 are pushed back by the first surface 30 of the male element 10 in an automatic manner, in other words, without any additional manual action other than the insertion of the male element 10 into the female element 100, in particular without any axial action on the operating ring 160. The valve 140 is maintained closed. The balls 132 push the plunger 170 back, and therefore here push the operating ring 160 back, against the locking spring 162. It is understood that the force required to continue the insertion movement depends, in particular, on the stiffness of the locking spring 162, the angle of inclination of the first surface 30, and the angle of inclination of the inclined surface forming the plunger 170.

As the insertion movement continues, the balls 132 reach the top of the first surface 30 of the collar 24, then the balls 132 are pushed against the central part 32 of the collar 24. The balls 132 are then in a position furthest from the central axis A100. The annular wall 20 of the male body 10 comes into contact with the valve 140, more precisely with the front extremity of the cylindrical envelope 146 of the valve 140. As the insertion movement continues, the male element 10 axially pushes the valve 140 back from its distal position toward its proximal position, so that the fluid connection is established between the duct V10 of the male element 10 and the duct V100 of the female element 100. The quick connector R is then in the configuration shown in FIG. 4.

As the insertion movement continues, the balls 132 are pressed against the second surface 34 of the collar 24 of the male element 10 and are displaced toward the second cylindrical portion 26, until in contact with the second cylindrical portion 26, between the second surface 34 and the third surface 36 of the male element 10. The balls are then engaged in the groove 40. During this movement, the operating ring 160 returns to its advanced position. This operation constitutes an automatic quick connector R, for which no operating action is required other than the manual insertion of the male element 10 into the insertion channel V106 of the female element 100.

Figure 5:
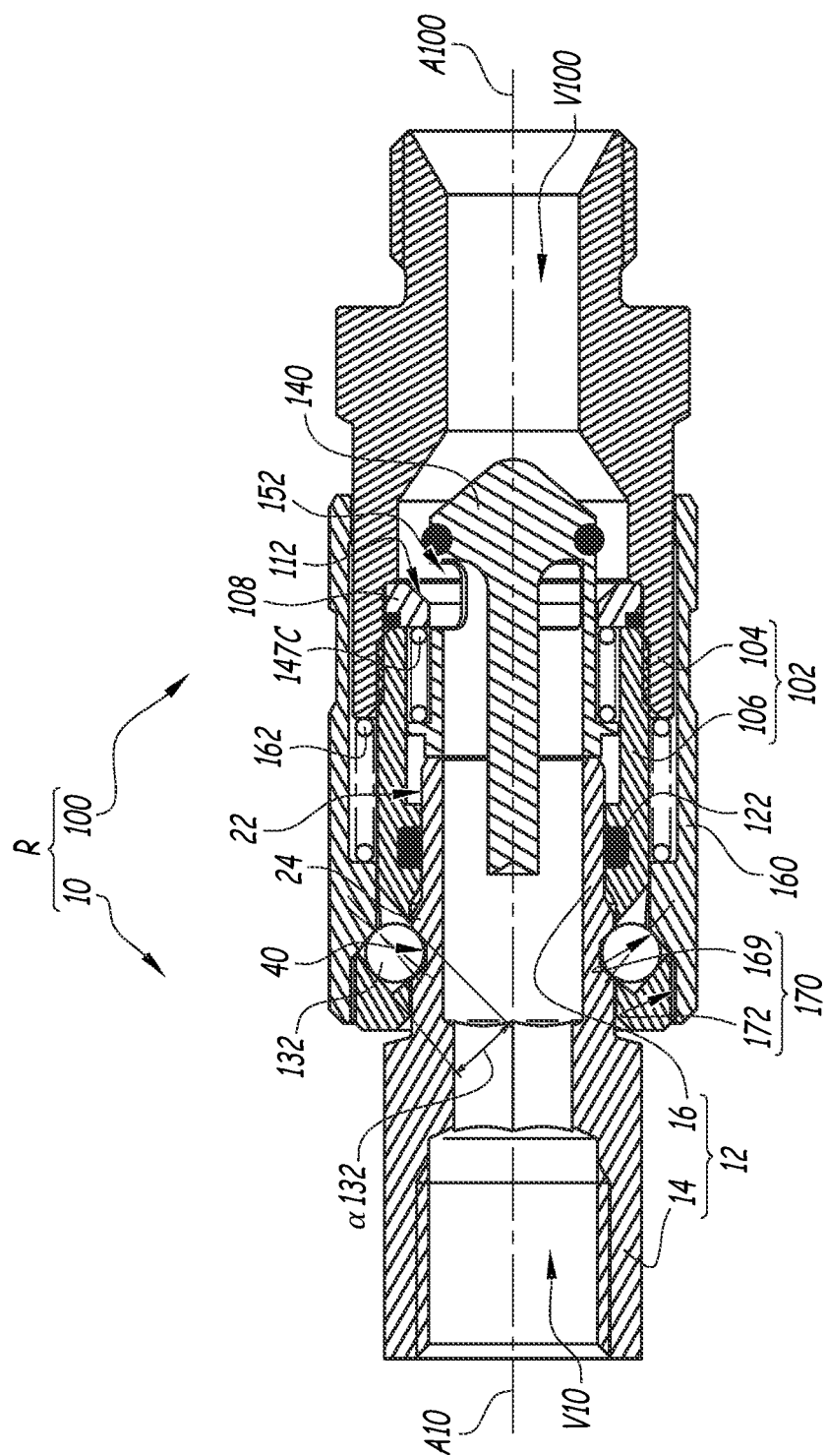
FIG. 5 is a longitudinal section of the quick connector of FIG. 1, shown in a final configuration of the coupling movement, the so-called coupled configuration.

The quick connector R is then in the coupled configuration, as shown in FIG. 5. The duct V10 of the male element 10 and the duct V100 of the female element 100 are in fluid communication with each other, the seal between the male element 10 and the female element 100 being maintained by the annular seal 122. The balls 132 are then in their distal position and are maintained in this distal position by the second and third surfaces 34 and 36, which are arranged facing each other and are here inclined at ±45°. The groove 40 has a trapezoidal profile.

It is understood that when the quick connector R is in the coupled configuration and a pressurized fluid flows through the ducts V10 and V100 of the coupled male element 10 and the female element 100, the pressure of this fluid tends to move the male element 10 away from the female element 100, the balls 132 then being pressed against a wall of the housing 130, here inclined at 50° toward the rear of the female element 100, and against the second surface 34 of the male element 10, here inclined at 45° toward the rear of the male element 10. Thus, as shown in the cross-section of FIG. 7, each ball 132 finds itself being pressed between two surfaces which are not parallel, but which form between them a so-called "pinch angle" α132, which is non-zero, in such a way that this ball 132 is pushed back toward its distal position, in other words toward the groove 40 of the male element 10. Here, the pinch angle α 132 is equal to 5°. The balls 132, maintained in the groove 40 of the male element 10, limit the axial movements of the male element 10 parallel to the central axis A100. The groove 40 is thus a locking groove.

Preferably, when the quick connector R is in the coupled configuration, the operating ring 160 is in front abutment against the female body 102, in such a way that a dimensional clearance is provided between each ball 132 and the facing plunger 170, in particular between each ball and the wall 169 of the plunger 170.

As an alternative, not shown, when the quick connector R is in the coupled configuration, the plunger 170 presses against the balls 132, in other words, the locking ring 160 exerts a centripetal force on the locking balls 132.

Figure 6:
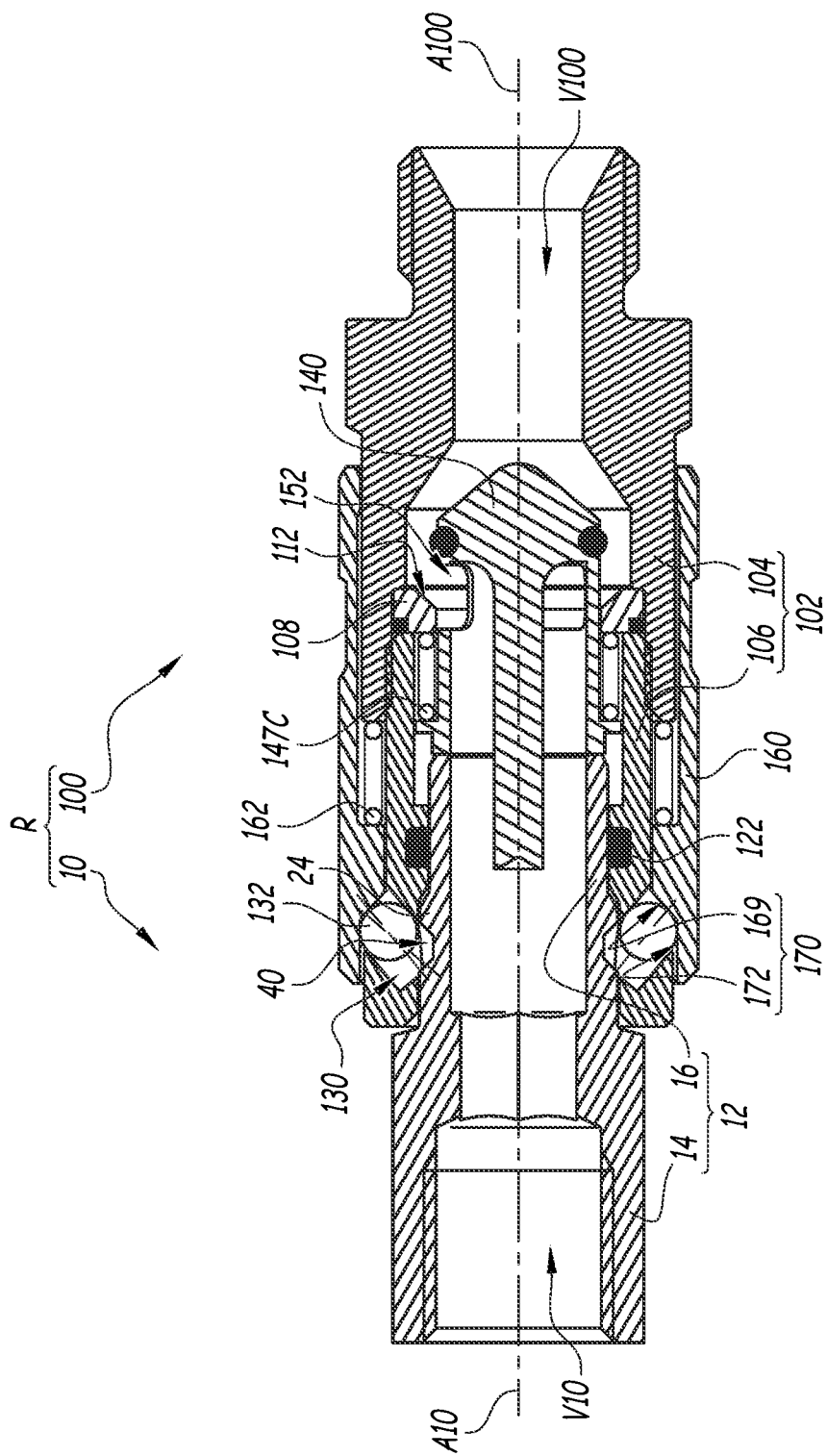
FIG. 6 is a longitudinal section of the quick connector of FIG. 1, shown in a fourth intermediate configuration, so-called intermediate release configuration, during an uncoupling movement.

A sequence for uncoupling the R quick connector is now described, with reference to FIGS. 5 to 7.

While the quick connector R is in the coupled configuration, as shown in FIG. 5, the operator initially moves the female element 100 slightly closer to the male element 10, so as to relieve the balls 132 of the pressing action of the collar 24 of the male element 10, this pressing action being due to the pinching angle between each housing 130 and the second surface 34 of the collar 24. This initial movement is only possible if the fluid flowing through the quick connector R is not under pressure, which prevents an operator from uncoupling the pressurized quick connector R and thus adds safety when using the connector R.

In the illustrated example, the female element 100 is brought closer to the male element 10 until the front body 106 of the female element 100 abuts against the shoulder 44 of the male body 10. The operator then displaces the operating ring 160 according to a backward movement, in other words, from the advanced position to the retracted position, against the force of the locking spring 162. The balls 132, which are here magnetic, are magnetically attracted by the operating ring 160, made here of stainless steel, and remain in contact with the wall 169 of the plunger 170. The male body 12 and the front body 106 are made of non-magnetic materials, here in brass, in such a way that the male body 12 and the front body 106 do not interfere with the force of attraction between the balls 132 and the plunger 170.

The balls 132 are thus displaced, each in its respective housing 130, from the distal position toward the proximal position. While the backward movement of the operating ring 160 continues, the balls 132, still in contact with the wall 169 of the plunger 170, also come into contact with the radial wall 172 of the plunger 170. The quick connector R is now in an intermediate unlocking configuration, as shown in FIG. 6. The operating ring 160 is in an intermediate unlocking position.

The balls 132 are then in the proximal position, in which the balls 132 are disengaged from the locking groove 40 of the male element 10, and no longer prevent axial movement of the male element 10 relative to the female element 100.

The backward movement of the operating ring 160 continues until the operating ring 160 reaches its rear position, as shown in FIG. 7, where the quick connector R is in an unlocked configuration. The backward movement of the operating ring 160 between the unlocked intermediate position and the rear position corresponds to an overtravel movement, also simply called overtravel, of the operating ring 160.

During the overtravel movement of the operating ring 160, the balls 132 remain in contact with the radial wall 172 of the plunger 170. The magnetic attraction is thus maintained between the balls 132 and the radial wall 172. The balls 132 are thus maintained in the proximal position.

It is understood that as long as the operating ring 160 is maintained in the intermediate unlocking position, or in the rear position, or in any other intermediate position between these two positions, the user can move the male element 10 away from the female element 100 according to an uncoupling movement, opposite to the insertion movement.

During this uncoupling movement, the valve 140 gradually returns to its distal position, closing the duct V100 of the female element 100. Thanks to the return spring 147C, the valve 140 helps to expel the male element 10 on uncoupling, thus preventing the balls 132 from returning to their distal position and preventing uncoupling difficulties.

With reference to FIGS. 8 to 14, the quick connectors R are now described in accordance with the second, third and fourth embodiments of the invention. For each newly described embodiment, the elements similar to those of the previous embodiment(s) carry the same references and function in the same way. In the following, the differences between each embodiment and the previous ones are mainly described.

Figure 8:
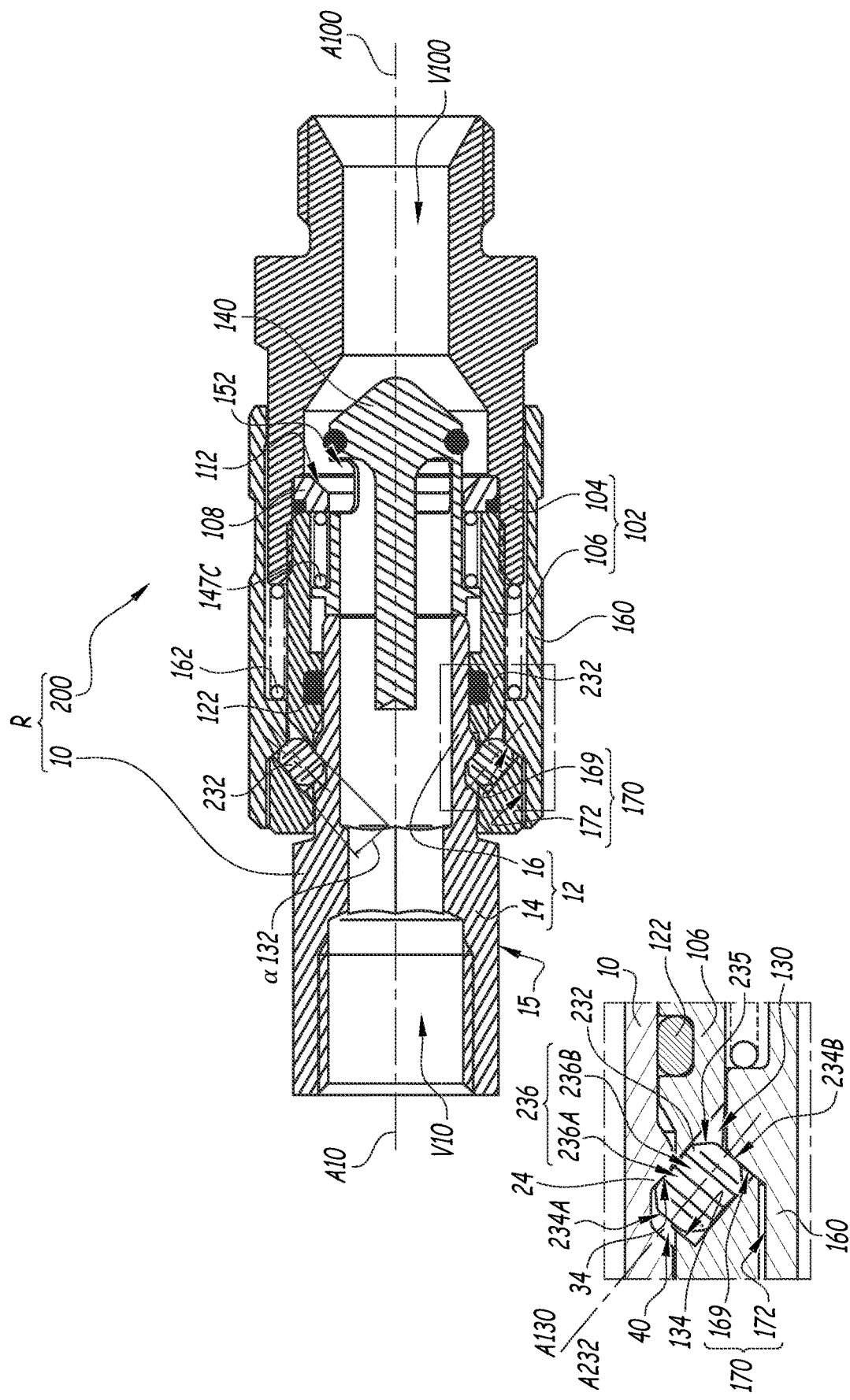
FIG. 8 is a longitudinal section of a quick connector, in accordance with a second embodiment of the invention, comprising a female element and an associated male element, shown in the coupled configuration.
Figure 9:
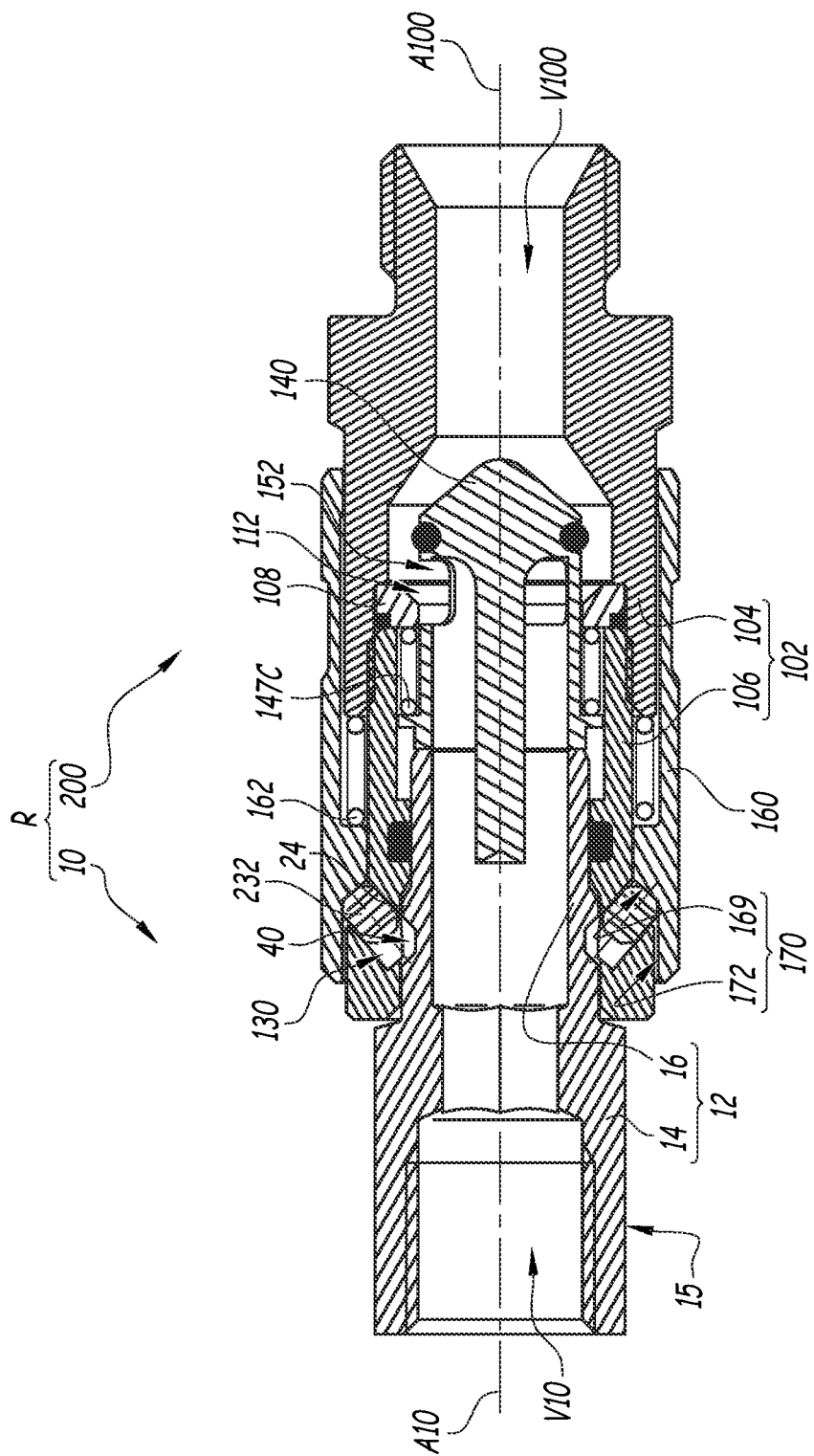
FIG. 9 is a longitudinal section of the quick connector of FIG. 8, shown in the intermediate release configuration.
Figure 10:
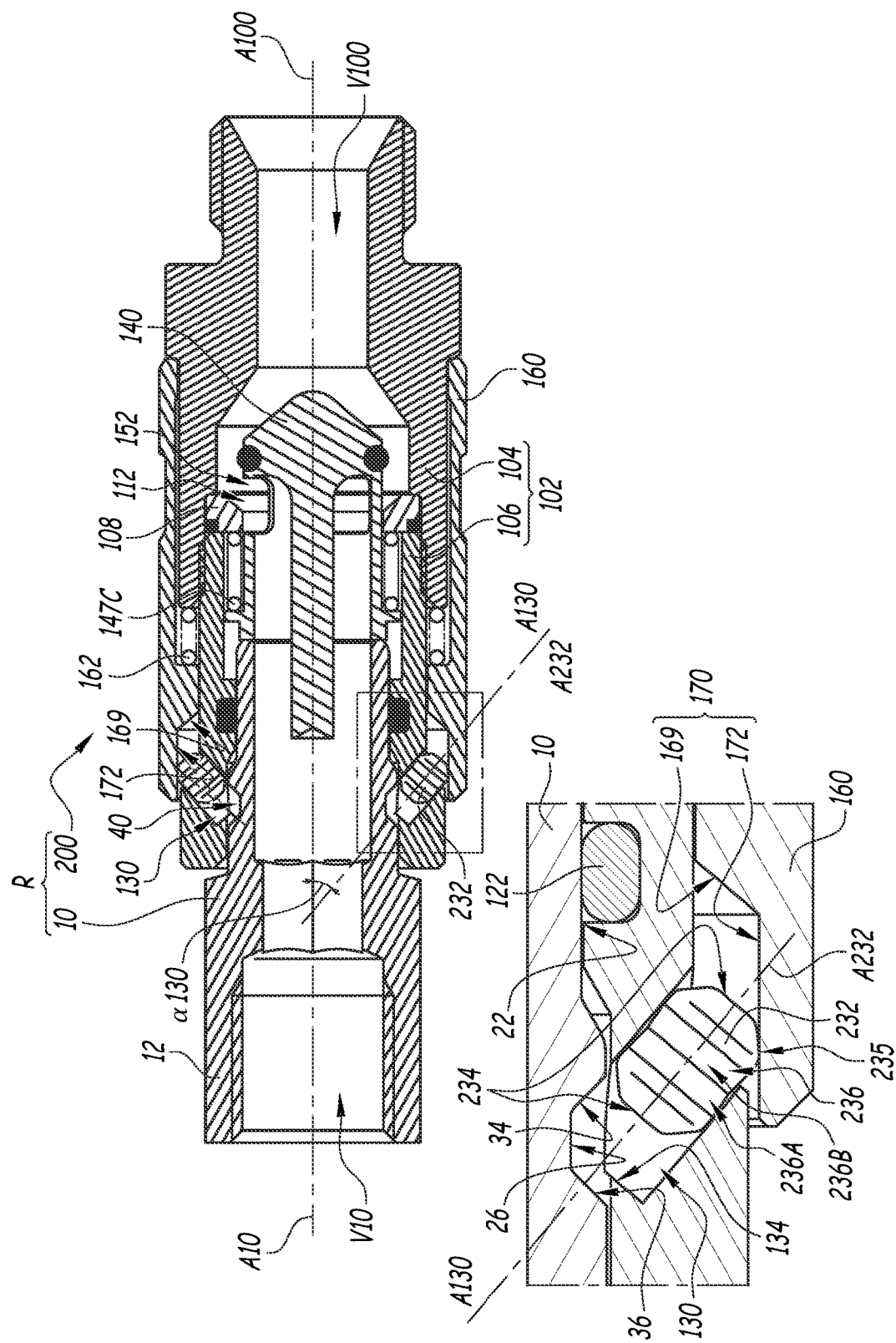
FIG. 10 is a longitudinal section of the quick connector of FIG. 8, shown in the unlocked configuration.

With reference to FIGS. 8 to 10, the quick connector R in accordance with the second embodiment of the invention comprises the male element 10 and a female element 200. In FIG. 8, the quick connector R is shown in the coupled configuration, while in FIG. 9, the quick connector R is shown in the intermediate unlocked configuration, and in FIG. 10, the quick connector R is shown in the unlocked configuration.

One of the main differences between the second embodiment and the first embodiment is that the female element 200 comprises locking elements which are the pins 232, instead of the balls 132 in the first embodiment. The pins 232 are made of a magnetic material, while the operating ring 160 is made of a ferromagnetic material, in this case stainless steel.

Each pin 232 presents here a form of revolution about an axis of revolution A232, which coincides with the guide axis A130 when this pin 232 is received in the corresponding housing 130. The pins 232 are preferably identical to each other. The shape of the pins 232 is not limiting. In an alternative, not shown, the locking members are locking fingers.

Each pin 232 presents a generally cylindrical shape, circular in cross-section and centered on the axis of revolution A232. Each pin 232 comprises two extremities 234, which here extend orthogonally to the axis of revolution A232. The lower extremity 234A is that of the two extremities 234 which is closest to the central axis A100, and the upper extremity 234B is the other of the two extremities 234. The upper extremity 234B is therefore located on the side of the plunger 170.

For each housing 130, the guide axis 130 is orthogonal to the wall 169 of the plunger 170, in such a way that when the pin 232 is received in this housing 130, the axis of revolution 232 is orthogonal to the wall 169 of the plunger 170, so as to promote contact between each pin 232 and the wall 169 of the plunger 170, thus maximizing the force of attraction between each pin 232 and the plunger 170.

The extremities 234 are beveled, forming beveled walls 235, which here are frustoconical surfaces centered on the axis of revolution A232. The beveled walls are arranged in such a way that a generatrix of the beveled wall 235 makes contact with the operating ring 160 in the proximal position, as shown in FIGS. 9 and 10. In other words, when the pin 232 is in the proximal position, the pin 232 is in linear contact with the ring 160. More precisely, the beveled wall 235 of each pin 232 is in linear contact against the radial wall 172 of the plunger 170, here manufactured in one piece with the operating ring 160.

By comparison, in the first embodiment, each ball 132 is in point contact with the surfaces of the male element 10 or of the operating ring 160, and therefore also with the surfaces of the plunger 170. When the pins 232 are in linear contact with the plunger 170, the force of attraction between each pin 232 and the plunger 170 is greater than the force of attraction between the balls 131 and the plunger 170.

Each pin 232 also comprises a circumferential V shaped groove 236, which is recessed and presents a flared V shaped profile. The V shaped groove 236 is formed midway between the two extremities 234 of the pin 232, the two arms of the V forming two frustoconical surfaces, including a first frustoconical surface 236A and a second frustoconical surface 236B. When the pin 232 is received in the corresponding housing 130, the first frustoconical surface 236A is generally closer to the central axis A100 than the second frustoconical surface 236B. Advantageously, the female element 100 of the quick connector R is suitable for coupling to a male element 10 with a collar 24 of low height relative to the front portion 16.

When the quick connector R is in the coupled configuration, the first frustoconical surface 236A is configured to press linearly on the second surface 36 of the collar 24 of the male element 10, thus allowing better retention of the male element 10. In other words, as illustrated in the cross-sectional plane of FIGS. 8 and 9, the first frustoconical surface 236A is able to cooperate in a parallel manner to the distal edge of the groove 40, the distal edge here being the second surface 34 of the collar 24. In the example shown, the V shaped groove 236 presents an opening angle of 170°. Each of the first frustoconical surface 236A and second frustoconical surface 236B is therefore inclined at an angle of 5° relative to the axis of revolution A232.

Figure 11:
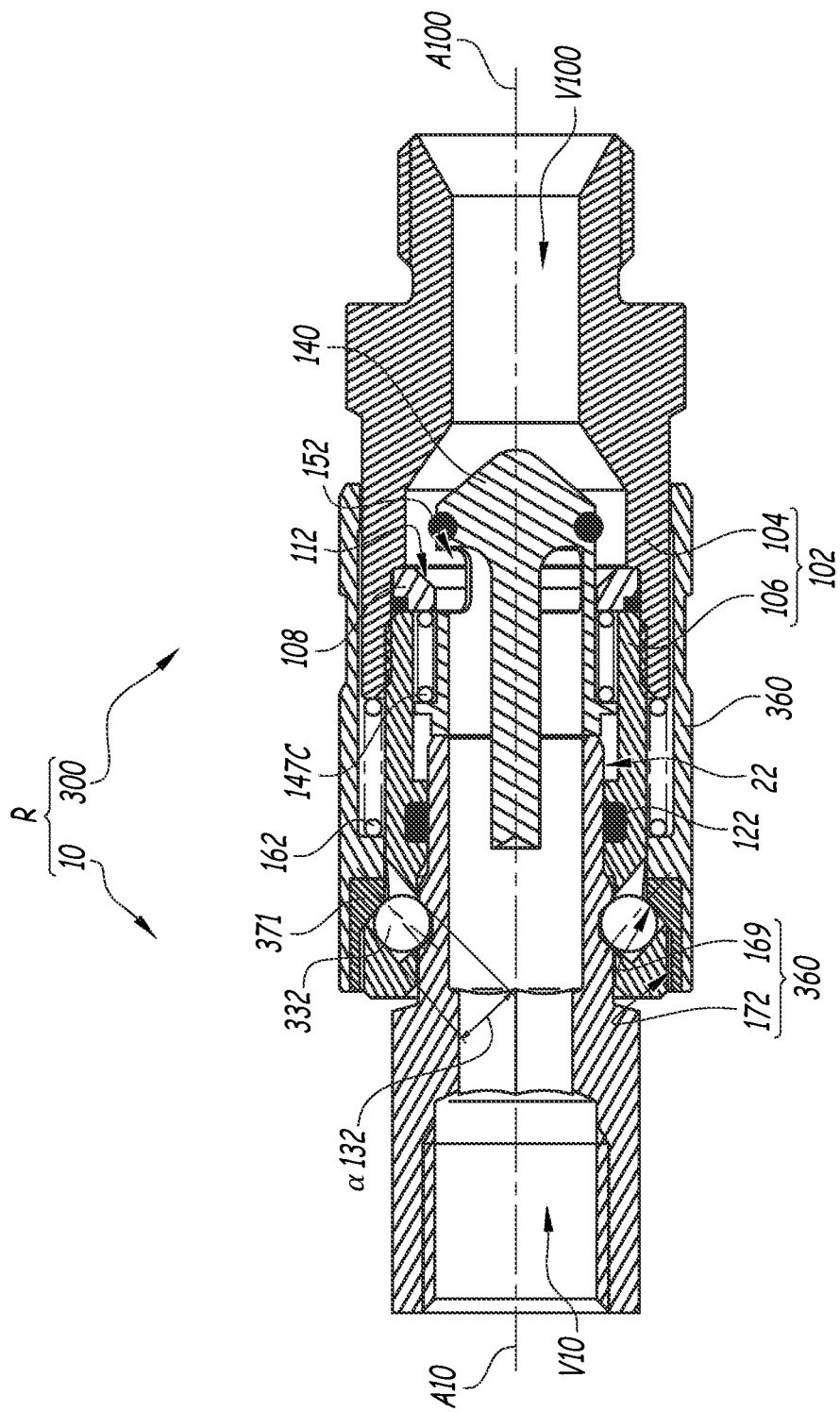
FIG. 11 is a longitudinal section of a quick connector, in accordance with a third embodiment of the invention, comprising a female element and an associated male element, shown in the coupled configuration.
Figure 12:
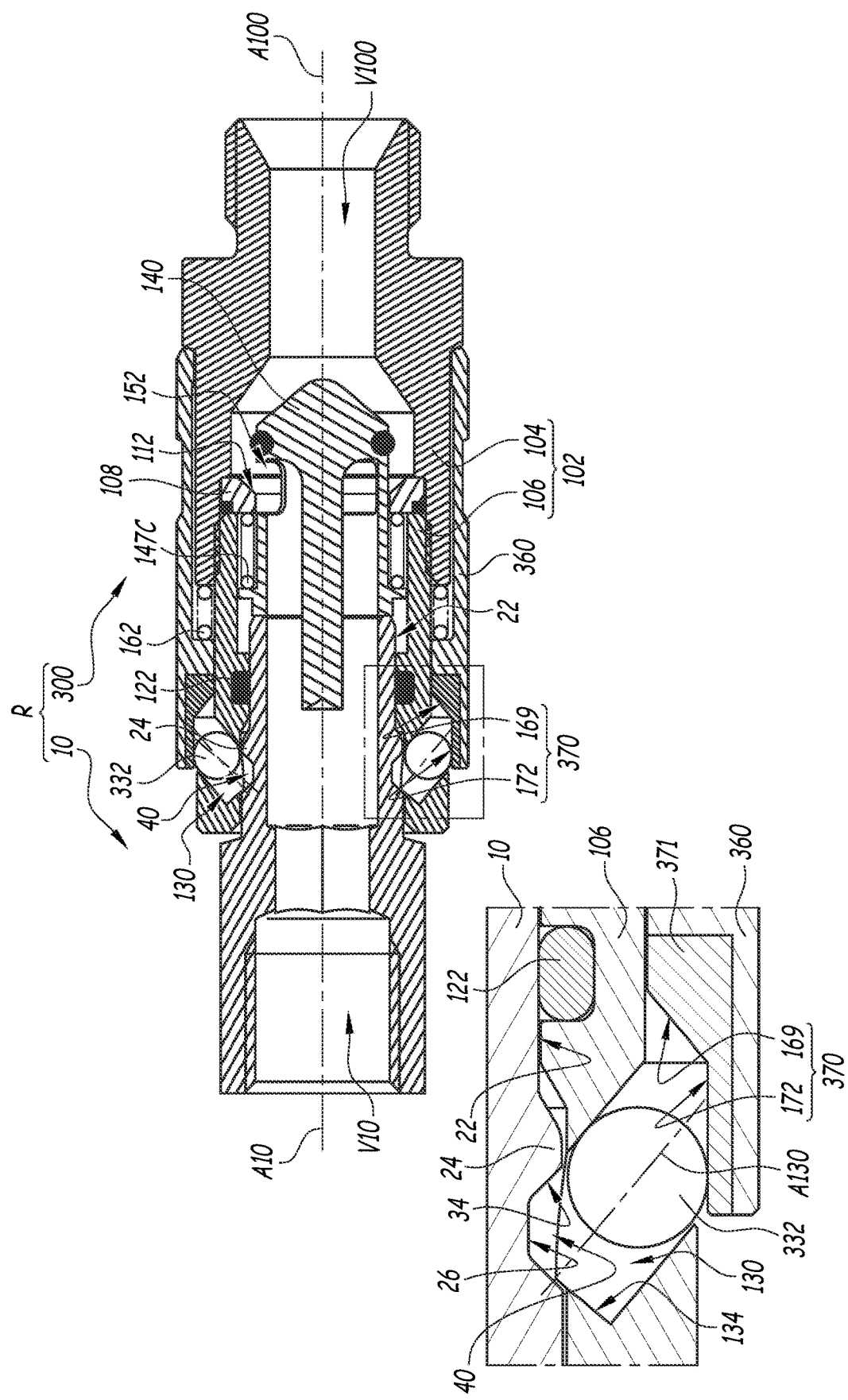
FIG. 12 is a longitudinal section of the quick connector of FIG. 11, shown in the intermediate unlocking configuration.

Referring to FIGS. 11 and 12, the quick connector R according to the third embodiment of the invention comprises the male element 10 and a female element 300. In FIG. 11, the quick connector R is shown in the coupled configuration, while in FIG. 12, the quick connector R is shown in the unlocked configuration.

Whereas in the previous embodiments, the plunger 170 is integral with the operating ring 160, in the third embodiment, the female element 300 comprises an operating ring 360 with a plunger 370 attached to the rest of the operating ring.

The plunger 370 is formed here by an insert 371, which is manufactured separately from the rest of the operating ring 360 and is then secured to the rest of the operating ring 360. The insert 371 is here fitted into a front counterbore 361 of the operating ring 360, for example by force-fitting or shrink-fitting. As in the previous embodiments, once secured to the operating ring 360, the plunger 370 defines an inner wall, oriented toward the central axis A100, this inner wall including the inclined wall 169 and the radial wall 172, forming contact surfaces for the balls 132. The wall 169 of the plunger 370 presents a frustoconical shape and is here inclined at 45° and oriented toward the front of the female element 100. As before, the radial wall 172 is parallel to the central axis A100.

In the illustrated example, the attached plunger 370 is made of a magnetic material, while the female element 300 comprises balls 332, forming locking members, which are made of a ferromagnetic material, in such a way that each locking member—here the balls 332—and the plunger 370 are configured to be magnetically attracted to each other.

Advantageously, the remainder of the operating ring 360, in other words, not including the magnetic insert 371, is made of a non-magnetic material, for example, brass, which is easy and economical.

According to a mirror alternative not shown, the balls 332 are magnetic, while the plunger 370, formed by the insert 371 secured to the rest of the operating ring 360, is made of a ferromagnetic material. This alternative is similar to the first embodiment.

According to another alternative, not shown, the balls 332 are replaced by pins, similar to the pins 232 of the second embodiment. according to yet another alternative, when both the plunger 370 and the locking members—balls or pins—are magnetic, the north/south magnetic poles are arranged in such a way that each locking member is magnetically attracted to the plunger.

Figure 13:
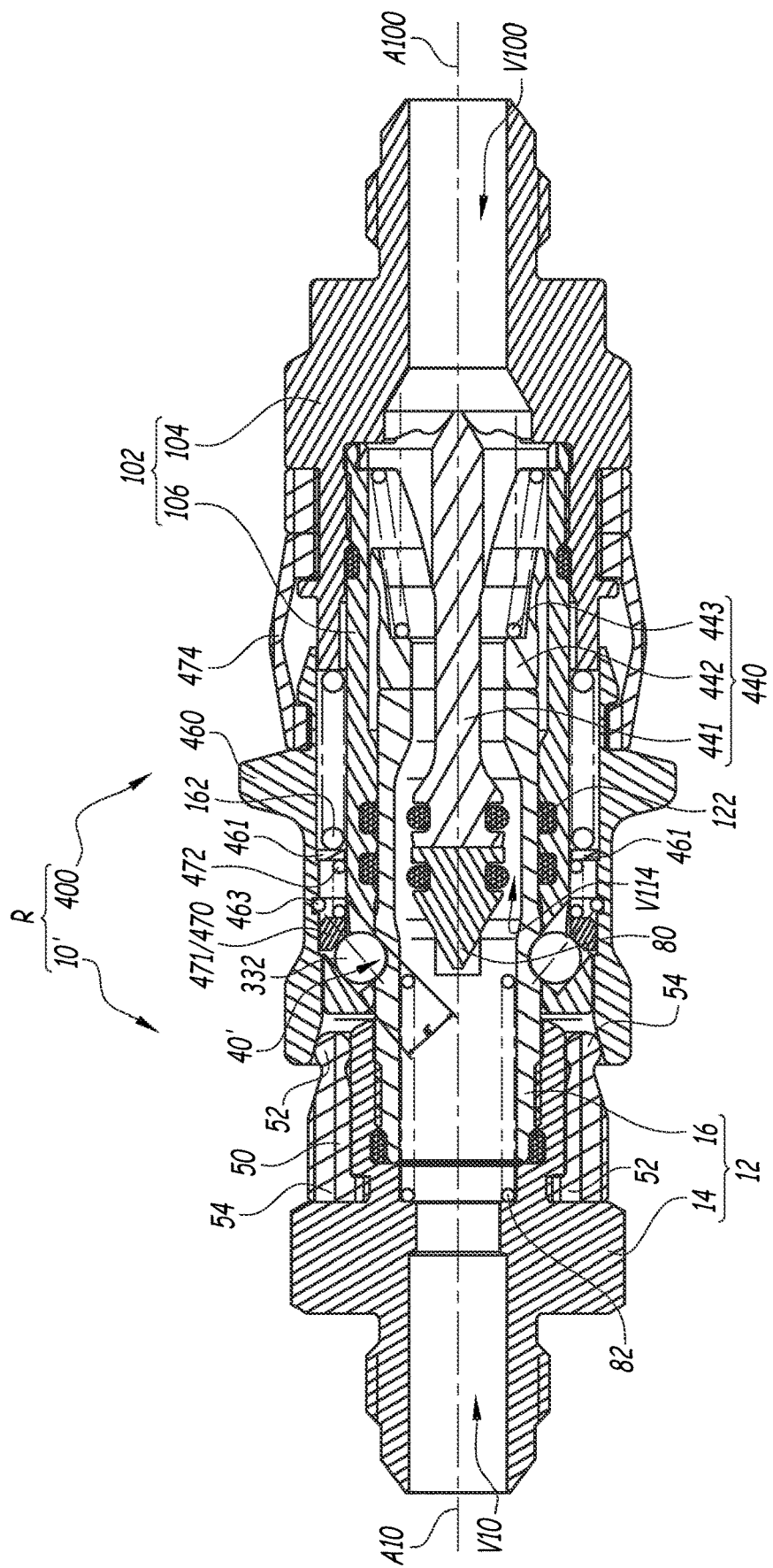
FIG. 13 is a longitudinal section of a quick connector, in accordance with a fourth embodiment of the invention, comprising a female element and an associated male element, shown in the coupled configuration.
Figure 14:
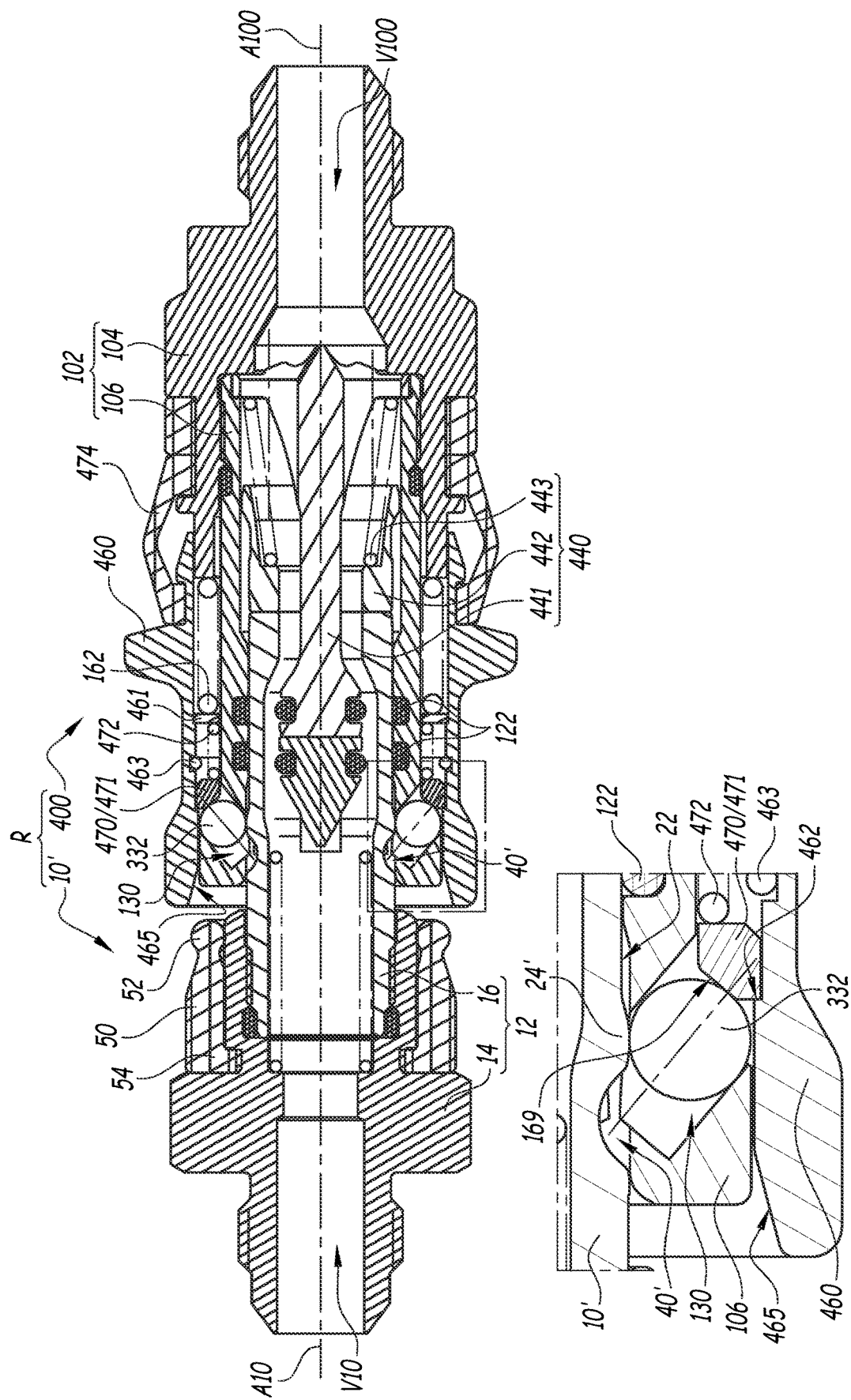
FIG. 14 is a longitudinal section of the quick connector of FIG. 13, shown in the intermediate unlocking configuration.

With reference to FIGS. 13 and 14, the quick connector R in accordance with the fourth embodiment of the invention comprises a male element 10' and a female element 400. In FIG. 13, the quick connector R is shown in the coupled configuration, while in FIG. 14, the quick connector R is shown in the unlocked configuration.

One of the main differences between the fourth embodiment and the previous embodiments is that in the fourth embodiment, the female element 400 comprises an operating ring 460 and a plunger 470 which are not integral with each other.

The plunger 470 is formed here by a return ring 471, which is interposed, radially to the central axis A100, between the operating ring 460 and the female body 102. As in the third embodiment, the plunger 470 here is made of a magnetic material, while the balls 332 are made of a ferromagnetic material.

The plunger 470 presents a form of revolution about the central axis A100. The plunger 470 is axially movable along the central axis A100. The plunger 470 protects the inclined wall 169, which is configured to push the balls 332 to their distal position when the plunger 470 is in its front position, and which is able to magnetically drive each ball 332 toward its proximal position when the plunger 470 is displaced toward its rear position.

The operating ring 460 comprises a washer 461, against which the locking spring 162 presses, pushing the operating ring 460 toward its advance position. In the illustrated example, the female element 400 also comprises an additional return member, in this case a plunger spring 472, which is interposed axially between the washer 461 and the plunger 470, so as to push the plunger 470 toward its front position. In other words, the plunger spring 472 constitutes a means of returning the plunger ring 471 toward its front position.

In an alternative, not shown, the plunger spring 472 presses against the rear body 104 and constitutes a means of returning the operating ring 460 toward the front position.

On the front side, the relative movements of the plunger 470 relative to the operating ring 460 are limited by an axial stop formed by a shoulder 462 arranged in an inner surface of the operating ring 460.

On the rear side, the relative movements of the plunger 470 relative to the operating ring 460 are limited by a stop formed by a snap ring 463, which here is received in a groove arranged in the inner surface of the operating ring 460.

Despite the relative complexity of the female element 400 of the fourth embodiment relative to the other embodiments, the return ring 471 is removable and can thus be replaced, during maintenance of the female element 400, for example if the return ring 471 is damaged or if its magnetic remanence falls below a predetermined level.

As an alternative, not shown, the plunger spring 472 is omitted, the plunger 470 being pushed toward the front by the snap ring 463 of the operating ring 460.

In the fourth embodiment, the male element 10' comprises a groove 40' which, unlike the trapezoidal locking groove 40 of the previous embodiments, here presents a rounded profile. The profile of the grooves 40 or 40' is not limiting. Similarly, the male element 10' here comprises a locking collar 24' with a rounded profile. The profiles of the collars 24 or 24' of the male element 10 or 10' are not limiting.

In the fourth embodiment, the rear part 14 and the front portion 16 of the male body 12 are two separate parts, which are assembled together in a sealed manner, here by screwing.

The male element 10' comprises a closing valve 80, which is received in the duct V10 of the male element 10 and is axially movable, along the main axis A10, between a front position, in which the valve 80 closes the duct V10 in a sealed manner, and a rear position, in which the valve 80 does not close the duct V10. Here, the valve 80 is pushed toward its front position by means of a closing spring 82, which is received in the duct V10 of the male element 10 and which presses against the male body 10.

The female element 400 here comprises two annular seals 122, which are arranged in the front enclosure V114, and which are configured to ensure the seal with the male element 10' when the male element 10' is inserted into the front enclosure V114.

The female element 400 comprises a valve 440, which comprises a central piston 441, which is fixed relative to the female body 102, and a slide 442, which is arranged around the central piston 441. The slide 442 is axially movable along the central axis A100, between a closed position, in which the slide 442 cooperates with the central piston 441 so as to close the insertion channel V106 of the female element 100, and an open position, in which the insertion channel V106 is not closed, as shown in FIGS. 13 and 14. The slide 442 is pushed back toward its closed position by a closing spring 443, which here presses against the female body 102.

The male element 10' advantageously comprises a cover 50, which is configured to rest on an annular wall 465 of the operating ring 460, in the coupled configuration of the quick connector R. The cover 50 serves to limit internal contamination. In the example shown, the cover 50 is made of an elastically deformable material, preferably elastomer. The cover 50 forms a sleeve which extends from the rear part 16 of the male element 10' toward the front of the male element 10'. The cap 50 presents a rear extremity 54, which is fixed here in a groove in the rear part 14, and a front extremity 52, which is opposite the rear extremity 54 and is configured to press against a front extremity of the operating ring 460, in particular against the annular wall 465 of the operating ring 460.

Here, the annular wall 465 of the operating ring 460 presents a frustoconical shape centered on central axis A100. When the operating ring 460 is in the advanced position, the annular wall 465 extends, toward the front of the female element 400, beyond the front body 106, in such a way that when the quick connector R is in the locked configuration, the cover 50 presses against the annular wall 465, preventing the intrusion of foreign bodies, for example dust, into the quick connector R mechanism.

Thus, in the fourth embodiment, thanks to the plunger spring 472 interposed axially between the washer 461 and the return ring 471, the position of the return ring 471 remains independent of the position of the operating ring 460 to guarantee an advanced position of the plunger 470. It is thus possible to guarantee that the balls 332 are maintained in the distal position, while reducing the amplitude of the displacement toward the front of the operating ring 460, which ensures the sealing of the connector R by cooperation with the cover 50.

The female element 400 also comprises an elastic sleeve 474, which is arranged axially between the female body 102 and the operating ring 460. In the illustrated example, the elastic sleeve 474 extends continuously from the rear body 104 to the operating ring 460, the elastic sleeve 474 deforming elastically when the operating ring 460 is displaced between the advanced and retracted positions. The elastic sleeve 474 prevents the intrusion of foreign bodies, dust or liquids, between the operating ring 460 and the rear body 104 of the female body 102. In other words, the elastic sleeve 474 ensures the seal of an annular space between the female body 102 and the operating ring 460.

Regardless of the embodiment of the invention, it is understood that each locking member—ball or pin—and the plunger are configured to be magnetically attracted to each other, in such a way that the plunger is able to magnetically drive each locking member toward its proximal position when the plunger is displaced toward its rear position.

Thus, at least one of the elements from among the plunger wall and the locking members is made of a material that stores magnetic energy, while the other element of the locking members and the plunger wall presents a capacity to conduct the magnetic flux/possess magnetic permeability.

In an alternative, not shown, the two elements from among the plunger wall and the locking members have a capacity to be magnetized or to store magnetic energy. In this case, the north/south magnetic poles of the plunger wall and the locking members are arranged in such a way that each locking member and the plunger are magnetically attracted to each other.

Generally speaking, the magnetic permeability materials that react to the magnet are based on Fe Ni Cobalt Gadolinium elements. Martensitic or ferritic stainless steel is magnetic, but not all stainless steels are.

Non-reactive, non-magnetic materials have low permeability, for example, austenitic stainless steel, copper, aluminum. They can also be described as paramagnetic when they present only weak attraction by a magnet. Alternatively, the male body 12 and the front body 116 could be made of paramagnetic material.

There are also magnetized ferrite powders which can be used as a coating layer for the wall of the plunger, and which have the capacity to magnetize a ferromagnetic ball. The magnetized powders are, for example, embedded in a binder and applied as a magnetic paint.

In the third and fourth embodiments, the insert 371 or the return ring 471 are advantageously made entirely of a magnetic material. The use of a single material facilitates the production of a magnetic plunger. In other words, the plunger 370 or 470 presents an annular magnetic wall.

In an alternative, not shown, the magnetic wall of the plunger is not annular, but only portions facing the housings 130 are magnetic, so that the plunger is angularly indexed around the central axis A100 to match the magnetic portions with the housings.

According to another alternative, not shown, when the plunger material is rendered magnetic by a surface treatment, for example with a magnetic surface coating such as paint, only portions of the annular surface of the plunger are treated.

In the first and second embodiments, each of the locking members, the ball 132 or the pin 232, is magnetic, this configuration being preferred. In an alternative, not shown, only a part of the locking members, or even only one of the locking members, is magnetic.

In an alternative, not shown, the housing axes A130 of two respective housings 130 are not inclined at the same angle relative to the central axis A100.

In the illustrated embodiments, when the locking members, the balls 132 or the pins 232, are in the distal position, the locking members project sufficiently into the insertion channel V106 so that the locking members 132/232 make contact with the cylindrical portion 22 of the male element 10 received in the proximal volume V116, as illustrated in FIG. 2, in particular with the bevel 21.

In an alternative, not shown, the locking members in the distal position project into the insertion channel V106 less than in the illustrated embodiments, so that the female element is no longer configured so that the locking members make contact with the cylindrical portion 22 (or with the bevel 21) of the male element 10 received in the proximal volume V116, but only with the collar 24. This configuration is advantageous, as it prevents the locking members from repeatedly making contact with the cylindrical portion 22 of the male element 10, which allows to limit marking or damage to this cylindrical portion 22, which is functional for sealing the connector with the annular seal 122 in the coupled configuration. By extension, the risk of damage to the annular seal 122 is also reduced. This reduces the risk of leakage from the connector R in the coupled configuration.

The above-mentioned embodiments and alternatives can be combined with one another to generate new embodiments of the invention.

The invention claimed is:

1. A female element of a quick connector intended for [the] a removable connection of pressurized fluid pipes, said female element being able to be coupled with a complementary male element and comprising:
a hollow female body defining an insertion channel, the insertion channel defining a central axis of the female body and opening out from the female body by a mouth, the mouth defining a front side of the female element,
at least one locking member, which is received in a respective housing arranged in a thickness of the female body:
each housing presents an elongated shape along a guide axis, the guide axes being geometrically carried by a cone, which is centered on the central axis and which diverges toward a rear side of the female body so that each housing is inclined relative to the central axis of the female body, each housing opening into the insertion channel,
each locking member being movable in its housing between a distal position, in which the locking member projects into the insertion channel, and a proximal position, in which the locking member does not project into the insertion channel;
a plunger:
which comprises a wall oriented toward each housing, and
which is movable between a front position, in which the wall of the plunger maintains each locking member in its distal position, and a rear position, in which each locking member is in its proximal position,
an operating ring, which surrounds the female body and is movable relative to the female body along the central axis between an advanced position and a retracted position, the operating ring being configured to drive the plunger from the front position toward the rear position when the operating ring is displaced from the advanced position toward the retracted position, and
a first return member, configured to return the operating ring toward the advanced position,
wherein:
each locking member and the plunger are configured to be magnetically attracted to each other, and
the plunger is able to magnetically drive each locking member toward its proximal position when the plunger is displaced toward its rear position.

2. The female element according to claim 1, wherein the plunger is integral with the operating ring.

3. The female element according to claim 1, wherein the plunger is a return ring, which is centered on the central axis of the female element, which is movable in translation relative to the operating ring, and which is interposed radially between the operating ring and the female body.

4. The female element according to claim 3, wherein:
the operating ring comprises an axial stop, and
the female element comprises a second return member, which is configured to push the return ring back into its advanced position against the axial stop.

5. The female element according to claim 1, wherein the locking member is a ball.

6. The female element according to claim 1, wherein the locking member is a pin, which extends according to a guide axis of the housing.

7. The female element according to claim 1, wherein
either each locking member is magnetic and is able to able to magnetically attract the plunger,
or
the plunger is magnetic and is able to magnetically attract each locking member.

8. The female element according to claim 7, wherein each locking member and the plunger are made of a ferromagnetic material or are coated with a layer of ferromagnetic material.

9. The female element according to claim 1, wherein:
the female body comprises a front body, wherein each housing is formed,
the front body is made of a non-magnetic material.

10. The female element according to claim 1, wherein the female element comprises an elastic sleeve, which is axially arranged and extends continuously between the body and the operating ring, and which elastically deforms when the operating ring is displaced between the advanced and retracted positions.

11. The female element according to claim 1, wherein the wall of the plunger extends according to a cone of revolution centered on the central axis, the cone being open toward the front.

12. The female element according to claim 11, wherein the cone is open toward the front and presents, relative to the central axis, an angle at an apex equal to 40°.

13. The female element according to claim 1, wherein the female element comprises a valve for closing the insertion channel, the valve being movable along the central axis of the female element.

14. The female element according to claim 1, wherein the return member of the operating ring comprises a spring, which is radially interposed between the female body and the operating ring.

15. A quick connector designed for the connection of pressurized fluid pipes, the quick connector comprising:
a female element according to claim 1, and
a male member complementary to the female member, the male member being configured to couple with the female member in a coupled configuration of the connector,
wherein:
the male element comprises a male body, which is able to be received in the insertion channel of the female body and which extends according to a main axis, the main axis of the male element and the central axis of the female element being coaxial when the male body is received in the insertion channel of the female element,
the male body comprises a first surface, which is able to push the locking members into their proximal position when the male body is inserted into the insertion channel, and
the first surface is inclined, relative to the main axis, at an angle of between 20° and 40°.

16. The quick connector according to claim 15, wherein the male body comprises a second surface, which is able to cooperate with the locking members while the locking members are in a distal position so as to prevent axial withdrawal of the male body, the second surface being inclined relative to the main axis and forming with the main axis an angle of between 30° and 60°.

17. The quick connector according to claim 15, wherein the male element comprises a protective cover, which is configured to press on an annular wall of the operating ring, in the coupled configuration of the quick connector.

18. A female element of a quick connector intended for a removable connection of pressurized fluid pipes, said female element being able to be coupled with a complementary male element and comprising:
a hollow female body defining an insertion channel, the insertion channel defining a central axis of the female body and opening out from the female body by a mouth, the mouth defining a front side of the female element,
at least one locking member, which is received in a respective housing arranged in a thickness of the female body:
each housing being inclined relative to the central axis of the female body, and opening into the insertion channel,
each locking member being movable in its housing between a distal position, in which the locking member projects into the insertion channel, and a proximal position, in which the locking member does not project into the insertion channel;
a plunger:
which comprises a wall oriented toward each housing, and
which is movable between a front position, in which the wall of the plunger maintains each locking member in its distal position, and a rear position, in which each locking member is in its proximal position,
an operating ring, which surrounds the female body and is movable relative to the female body along the central axis between an advanced position and a retracted position, the operating ring being configured to drive the plunger from the front position toward the rear position when the operating ring is displaced from the advanced position toward the retracted position, and
a first return member, configured to return the operating ring toward the advanced position,
wherein: is able to magnetically drive each locking member toward its proximal position when the plunger is displaced toward its rear position
wherein the plunger or each locking member comprises a ferromagnetic insert oriented toward each locking member or the plunger respectively.

19. A female element of a quick connector intended for a removable connection of pressurized fluid pipes, said female element being able to be coupled with a complementary male element and comprising:
a hollow female body defining an insertion channel, the insertion channel defining a central axis of the female body and opening out from the female body by a mouth, the mouth defining a front side of the female element,
at least one locking member, which is received in a respective housing arranged in a thickness of the female body:
each housing being inclined relative to the central axis of the female body, and opening into the insertion channel,
each locking member being movable in its housing between a distal position, in which the locking member projects into the insertion channel, and a proximal position, in which the locking member does not project into the insertion channel;
a plunger:
which comprises a wall oriented toward each housing, and which is movable between a front position, in which the wall of the plunger maintains each locking member in its distal position, and a rear position, in which each locking member is in its proximal position,
an operating ring, which surrounds the female body and is movable relative to the female body along the central axis between an advanced position and a retracted position, the operating ring being configured to drive the plunger from the front position toward the rear position when the operating ring is displaced from the advanced position toward the retracted position, and a first return member, configured to return the operating ring toward the advanced position, wherein:
each locking member and the plunger are configured to be magnetically attracted to each other, and
the plunger is able to magnetically drive each locking member toward its proximal position when the plunger is displaced toward its rear position wherein the plunger comprises a radial wall, which is configured to magnetically attract the locking member and which extends parallel to the central axis according to a length greater than or equal to a stroke of the operating ring between its advanced position and its retracted position, minus an amount of axial displacement of the locking member between its distal position and its proximal position.

* * * * *